(12) United States Patent
Futami et al.

(10) Patent No.: US 7,835,643 B2
(45) Date of Patent: Nov. 16, 2010

(54) OPTICAL WAVEFORM MEASURING APPARATUS AND OPTICAL WAVEFORM MEASURING METHOD

(75) Inventors: Fumio Futami, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 11/136,489

(22) Filed: May 25, 2005

(65) Prior Publication Data

US 2006/0159463 A1 Jul. 20, 2006

(30) Foreign Application Priority Data

Jan. 17, 2005 (JP) .............................. 2005-009509

(51) Int. Cl.
*H04B 10/08* (2006.01)
*H04B 17/00* (2006.01)
*G01N 21/00* (2006.01)

(52) U.S. Cl. .............................. 398/25; 398/16; 398/28; 398/33; 398/65; 398/152; 356/73.1

(58) Field of Classification Search .............. 398/9, 398/25–34, 65, 101, 144–159, 202, 208, 398/209; 385/15, 122; 356/121; 250/225

See application file for complete search history.

(56) References Cited

U.S. PATENT DOCUMENTS

| | | | | |
|---|---|---|---|---|
| 5,477,375 | A * | 12/1995 | Korotky et al. | 359/264 |
| 5,798,853 | A * | 8/1998 | Watanabe | 398/150 |
| 6,720,548 | B2 * | 4/2004 | Otani et al. | 250/225 |
| 6,751,385 | B2 | 6/2004 | Futami et al. | 385/122 |
| 6,985,652 | B2 * | 1/2006 | Tatsuura et al. | 385/16 |

(Continued)

FOREIGN PATENT DOCUMENTS

EP  1 241 458  9/2002

(Continued)

OTHER PUBLICATIONS

S. Watanabe, et al., "Novel Fiber Kerr-Switch With Parametric Gain: Demonstration of Optical Demultiplexing and Sampling Up to 640 Gb/s", ECOC 2004, Proceedings-Post-deadline Paper Th4.1.6, Sep. 5-9, 2004 (pp. 12-13).

(Continued)

*Primary Examiner*—Li Liu
(74) *Attorney, Agent, or Firm*—Staas & Halsey LLP

(57) ABSTRACT

The present invention relates an optical waveform measuring apparatus designed to eliminate the polarization dependency of an intensity correlation signal without a polarization diversity arrangement. The apparatus comprises a sampling light outputting unit for outputting a sampling light pulse to sample light under measurement, a sampling result outputting unit for developing a nonlinear optical effect stemming from the light under measurement and the sampling light pulse from the sampling light outputting unit to output light corresponding to a result of the sampling of the light under measurement, and a polarization state control unit for, before the start of the measurement of the light under measurement, carrying out control on the basis of a power level of the light from the sampling result outputting unit so that a polarization state of the light under measurement, which is to be inputted to the sampling light output unit, is placed into a predetermined state.

19 Claims, 19 Drawing Sheets

U.S. PATENT DOCUMENTS

| | | | |
|---|---|---|---|
| 2002/0041618 A1 | 4/2002 | Watanabe et al. | 372/76 |
| 2003/0002833 A1* | 1/2003 | Futami et al. | 385/122 |
| 2003/0043366 A1* | 3/2003 | Ohta et al. | 356/121 |
| 2007/0065162 A1* | 3/2007 | Kikuchi | 398/208 |

FOREIGN PATENT DOCUMENTS

| | | | |
|---|---|---|---|
| JP | 5-307202 | | 11/1993 |
| JP | 8-184502 | | 7/1996 |
| JP | 08-184502 | * | 7/1996 |
| JP | 2002-77052 | | 3/2002 |
| JP | 2003-294539 | * | 3/2002 |
| JP | 2003-14548 | | 1/2003 |
| JP | 2003-294539 | | 10/2003 |

OTHER PUBLICATIONS

Nobuhide Yamada, et al., "Polarization-Insensitive Optical Sampling System Using Two KTP Crystals", IEEE Photonics Technology Letters, vol. 16, No. 1, Jan. 2004. (pp. 215-217).

Y. Takita, et al., "Highly Stable Ultra-Short Pulse Generation By Filtering Out Flat Optical Frequency Components", CLEO/IQEC 2004 Paper CtuN1, May 16-21, 2004.

C. Boerner, et al., "160 Gbit/s Clock Recovery With Electro-Optical PLL Using Bidirectionally Operated Electroabsorption Modulator as Phase Comparator", Electronics Letters, vol. 39, No. 14, Jul. 10, 2003. (pp. 1071-1073).

D. T. K. Tong, et al., "160 Gbit/s Clock Recovery Using Electroabsorption Modulator-Based Phase-Locked Loop", Electronics Letters vol. 36, No. 23, Nov. 9, 2000 (pp. 1951-1952).

S. Watanabe, et al. "160 Gbit/s Optical 3R-Regnerator in a Fiber Transmission Experiment", PD16-1,2,3.

Japanese Patent Office Action mailed May 7, 2008 for corresponding Japanese Patent Application No. 2005-009509.

European Search Report for corresponding EP Patent Application No. 05012207.6 mailed Apr. 5, 2006.

Japanese Patent Office Notification of Reasons for Refusal, mailed Oct. 2, 2007 for corresponding Japanese Patent Application No. 2005-009509.

* cited by examiner

FIG. 7
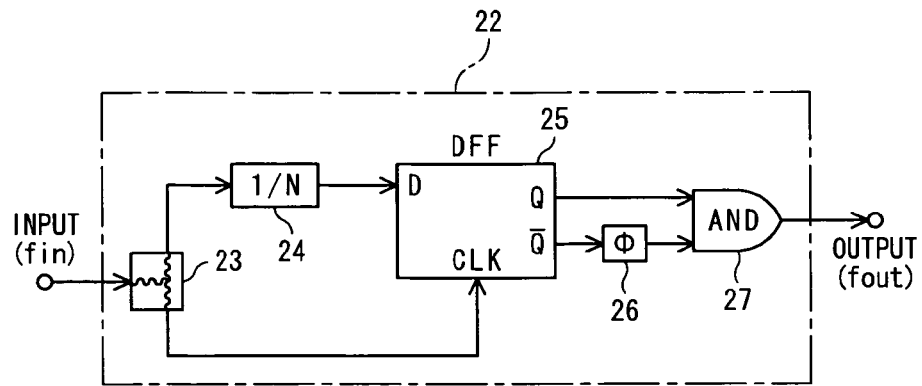
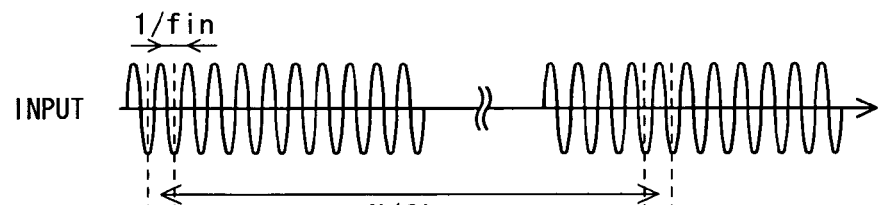
FIG. 8A INPUT
FIG. 8B OUTPUT
FIG. 9
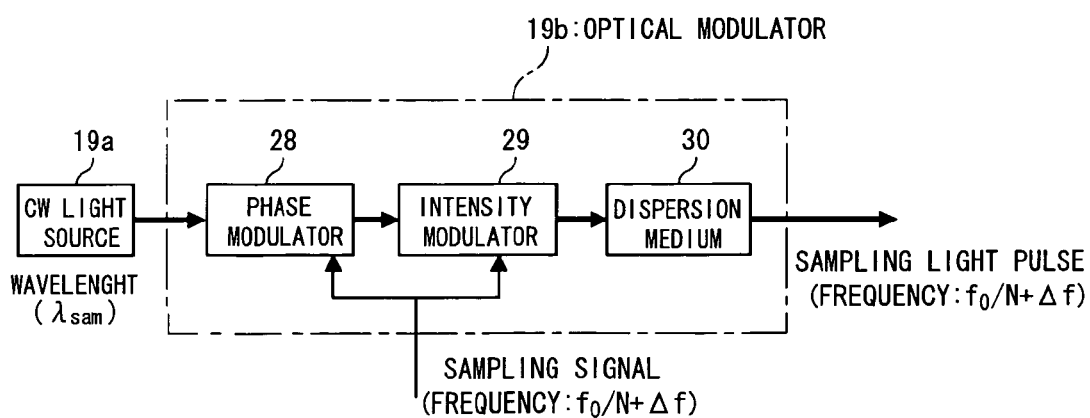

OPTICAL WAVEFORM MEASURING APPARATUS AND OPTICAL WAVEFORM MEASURING METHOD

BACKGROUND OF THE INVENTION

1) Field of the Invention

The present invention relates to an optical waveform measuring apparatus and an optical waveform measuring method, and more particularly to optical waveform measuring apparatus and method suitable for use in observing an optical pulse waveform, so as to make a faithful observation of an actual waveform. The optical pulse waveform encounters difficulty of accurate observations in fine detail through the use of electronic measurements, due to operating speed limitations on electronic circuits.

2) Description of the Related Art

In optical communications, the observation of an optical pulse waveform is a function needed for the evaluation of quality of an optical signal at receiver ends, and it is also applicable to a signal repeater or a node of an optical network for monitoring quality of signal. In addition, it exhibits a function indispensable to the evaluation of optical parts. Along with an increase in capacity for optical fiber communications, the bit rate of a signal light reaches 40 Gb/s at the research stage. Moreover, the research and development of a system exceeding 160 Gb/s have taken place very actively, aiming at a next-generation system. The promotion of these research and development requires a waveform measuring technique and waveform measuring apparatus capable of observing an actual waveform of signal light faithfully.

Now, in an optical waveform measuring apparatus commonly put to use, as shown in FIG. 23, an optical signal (optical pulse) under measurement is first converted through a photoelectric converter 101 into an electric signal. Following this, an electric sampling pulse is generated by an electric sampling pulse generating circuit 103 in accordance with an electric trigger from a trigger circuit 102 so that the electric signal from the photoelectric converter 101 is sampled with the electric sampling pulse in a sampling circuit 104 and the sampled waveform is displayed on a wave form indicator 105. That is, the wave form measurement is made by sampling an actual waveform of an optical signal with an electric signal.

At this time, for the faithful observation of the waveform of signal light, there is a need to receive all the frequency components constituting the signal light, which requires that the waveform measuring apparatus has a sufficiently broader bandwidth than the bit rate of the signal light. The observation bandwidth for the electric sampling measurements is limited by a device whose bandwidth is the narrowest among a photoelectric converter, a trigger circuit, a sampling circuit, a waveform indicator and other devices which configure the apparatus. Usually, an operating bandwidth limitation of an electronic circuit, considered to be 50 GHz, is not always sufficient to the fine observation of a signal of 40 Gb/s.

One solution to the problem on the bandwidth limitation involves an optical sampling technique of sampling signal light intact. According to this optical sampling technique, as shown in FIG. 24, an optical sampling gate 111 made of a nonlinear medium generates intensity correlation signal light relative to a light (wavelength: $\lambda sig$) under measurement and a sampling light pulse (wavelength: $\lambda sam$) shorter in pulse width than the light under measurement, thus outputting a sample result. In this case, the intensity correlation signal light signifies light generated when a light under measurement and a sampling light pulse overlaps with each other in the time domain.

The sampling light pulse is obtained as an output of an optical sampling gate 111 by driving the short pulse light source 112 with a sampling frequency signal from a sampling frequency generator 113. The sampling frequency generator 113 is made to output, as a sampling frequency signal, a frequency signal ($f_0/N+\Delta f$) obtained by N-dividing down a clock signal (repetition frequency $f_0$) synchronized with light under measurement and further frequency-shifting it by a frequency $\Delta f$ for sweep. The repetition frequency represents the inverse number of a repetition period of an optical pulse train.

In addition, the optical sampling gate 111 multiplexes this sampling light pulse and the light under measurement and introduces the multiplexed light into the nonlinear medium of the optical sampling gate 111, thereby generating a nonlinear effect. This nonlinear effect provides an optical signal having an intensity correlation with respect to the light under measurement and the sampling light pulse, i.e., an intensity correlation signal light (wavelength: $\lambda c$, repetition frequency: $f_0/N+\Delta f$). This intensity correlation signal light is extracted through an optical filter and outputted from the optical sampling gate 111.

The intensity correlation signal light outputted from the optical sampling gate 111 is converted into an electric correlation signal in a photoelectric converter 114 and, usually, after the conversion from an analog signal into a digital signal through the use of a sampling frequency signal, it is inputted to a vertical axis signal port of a waveform indicator 115 as an intensity correlation signal converted into an electric signal. In the waveform indicator 115, with respect to the intensity correlation signal inputted to the vertical axis signal port, a waveform of a light under measurement is displayed in a manner such that a sweep signal with a frequency $\Delta f$ to be used in the sampling frequency generator 113 is inputted to a horizontal axis signal port for triggering.

Since the time resolution of the optical sampling shown in FIG. 24 depends principally upon a pulse width of a sampling light pulse, when a sampling light pulse with a short pulse width is prepared, the optical sampling having a high time resolution is realizable. On the other hand, the intensity of a signal light corresponding to the vertical axis depends upon the magnitude of an intensity correlation signal light. This intensity correlation signal light develops in a nonlinear medium, and as this nonlinear medium, a potassium titanyl phosphate ($KTiOPO_4$: KTP) crystal, a periodically polled $LiNbO_3$ (PPLN) crystal or the like are available.

However, since the intensity correlation signal light developing within the aforesaid crystals depends upon the polarization states of the incident light under measurement and the sampling light pulse, difficulty is experienced in measuring a signal light waveform in an arbitrary polarization state.

For this reason, in the non-patent document 1 (N. Yamada et al., "Polarization-insensitive optical sampling system using two KTP crystals," IEEE Photonics technology letters, vol. 16, no. 1, pp. 215-217, 2004), as shown in FIG. 25, for solving the polarization dependency of the aforesaid intensity correlation signal light and for measuring a signal light waveform in an arbitrary polarization state, there is disclosed a polarization diversity arrangement made to separate an optical pulse into two polarization components of a TE polarization component and a TM polarization component through the use of a polarization beam splitter (PBS) 125 for generating intensity correlation signal lights of the polarization components in two nonlinear mediums. In FIG. 25, reference numeral 120 represents a pulse light source for generating a sampling light pulse, numerals 121 and 122 designate oscillators, numeral 123 depicts a mode locked fiber laser (MLFL), numerals 124 and 127 denote half wave plates (HWP), numerals 126, 129 and 131 indicate mirrors, numerals 128 and 130 show KTPs, numeral 132 signifies an Si-APD (Si-Avalanche Photo Diode), and numeral 133 represents an analog/digital converter, and numeral 134 designates a computer.

As a well-known technique for the removal of the polarization dependency, there has also been known a technique disclosed in the non-patent document 2 (S. Watanabe, et al., "Novel Fiber Kerr-Switch with Parametric Gain: Demonstration of Optical Demultiplexing and Sampling up to 640 Gb/s," Post deadline session, Th4. 1.6, 30th European Conference on Optical Communication, Sep. 5-9, 2004 Stockholm, Sweden). According to this technique, for the generation of an intensity correlation signal light, it is desirable that the polarization state of each of the light under measurement and the sampling light pulse is a linear polarization and the directions of the respective linear polarizations are different by 40 to 50 degrees from each other. That is, with reference to the linear polarization state of the light under measurement, it is desirable that the linear polarization of the sampling light pulse is inclined by 40 to 50 degrees. Moreover, even if each of the polarization states of the light under measurement and the sampling light pulse is not a linear polarization, there is no problem in the case of a polarization state capable of generating ameasurable intensity correlation signal light. For realizing this, each of the polarization states of the light under measurement and the sampling light pulse, incident on an optical fiber forming a nonlinear medium, is set through the use of a polarization controller. With this technique, there is a condition that the optimum polarization state for the generation of an intensity correlation signal light is not always realizable due to a variation of the polarization state within the optical fiber. In addition, in a case in which each of the polarization states of the light under measurement and the sampling light pulse is set in a manual fashion, it needs long time to set the optimum polarization states of the light under measurement and the sampling light. And not only that, in the case of the manual setting, difficulty is encountered in securing the accuracy and reproducibility. In particular, in a case in which a plurality of lights under measurement is observed simultaneously, there is a need not only to prepare required members corresponding in number to the lights under measurement to be observed at the same time but also to individually set the polarization states of the lights under measurement and the sampling light pulses accordingly, which requires an extremely long time for the initial setting.

The technique described in the aforesaid non-patent document 1 requires two KTPs, each of which is a relatively expensive material.

Moreover, the technique described in the non-patent document 2 does not have a function to monitor an intensity correlation signal light for controlling the polarization state of a light under measurement on the basis of the monitor result, and it does not disclose an arrangement for smoothly observing an actual waveform of the light under measurement regardless of the polarization state of the light under measurement.

SUMMARY OF THE INVENTION

The present invention has been developed with a view to eliminating these problems, and it is therefore an object of the invention to provide an optical waveform measuring apparatus and method capable of controlling a polarization state of a light under measurement on the basis of a power level of an intensity correlation signal light without employing a polarization diversity arrangement for generating an intensity correlation signal light without depending upon the polarization state of the light under measurement.

For this purpose, in accordance with an aspect of the present invention, there is provided an optical waveform measuring apparatus comprising a sampling light outputting unit for outputting a sampling light pulse to sample a light under measurement, a sampling result outputting unit for developing (producing) a nonlinear optical effect stemming from the light under measurement and the sampling light pulse from the sampling light outputting unit to output a light corresponding to a result of the sampling of the light under measurement, and a polarization state control unit for carrying out control on the basis of a power level of the light from the sampling result outputting unit so that a polarization state of the light under measurement, which is to be inputted to the sampling light output unit, is placed into a predetermined state.

In addition, it is also appropriate that the sampling light pulse to be outputted from the sampling light outputting unit has a pulse width shorter than that of the light under measurement and has a sampling frequency substantially equal to or longer than a repetition period of the light under measurement.

Still additionally, it is also appropriate that the polarization state control unit controls a polarization state of the sampling light pulse from the sampling light outputting unit.

Yet additionally, it is also appropriate that the polarization state control unit controls a polarization state of the sampling light pulse from the sampling light outputting unit through the use of a 45-degree rotation function of a polarizer.

Moreover, it is also appropriate that the sampling light outputting unit includes a frequency generating unit for generating a sampling frequency substantially equal to or lower than a repetition period of the light under measurement, and a sampling light producing unit for producing the sampling light pulse through an optical modulation based on the sampling frequency generated by the frequency generating unit.

In this case, it is also acceptable that the sampling light producing unit includes a continuous light source for outputting a continuous light, and a modulator for modulating the continuous light from the continuous light source into the sampling light pulse through the use of the sampling frequency signal generated from the frequency generating unit.

Still moreover, the modulator can be constructed with a lithium niobate optical modulator or an indium phosphorus optical modulator, and constructed with an electroabsorption optical modulator.

Yet moreover, it is also acceptable that the modulator includes a frequency chirp applying unit for applying a frequency chirp to the continuous light on the basis of the sampling frequency, a light pulsing unit for pulsing the light, to which the frequency chirp is applied by the frequency chirp applying unit, on the basis of the sampling frequency, and a dispersion compensating unit for carrying out a dispersion compensation on the light from the light pulsing unit to output it as the sampling light.

Furthermore, it is also possible that the sampling light producing unit includes a pulse compressing unit for pulse-compressing the light modulated by the modulator, and outputs, as the sampling light, the light compressed by the pulse compressing unit.

Still furthermore, it is also possible that the frequency generating unit includes a sweep signal producing unit for producing a sweep signal for sweeping the light under measurement, and a frequency shifting unit for receiving a clock signal synchronized with the light under measurement and for frequency-shifting the received clock signal through the use of the sweep signal from the sweep signal producing unit to generate a signal with the sampling frequency.

In this case, the frequency generating unit includes a frequency divider for dividing down the clock signal received by the frequency shifting unit so that the frequency shiffting unit frequency-shifts the clock signal, divided down by the frequency divider, through the use of the sweep signal to generate a signal with the sampling frequency.

Yet furthermore, it is also appropriate that the sampling result outputting unit includes a nonlinear medium for developing a nonlinear optical effect stemming from the light under measurement and the sampling light pulse, and a linear polarization component extracting unit for extracting a linear polarization component of the light under measurement, whose polarization state undergoes a variation due to the nonlinear optical effect developing in the nonlinear medium, for the waveform measurement, and the polarization state control unit carries out control so that the polarization state of the light under measurement to be inputted to the nonlinear medium becomes a linear polarization substantially perpendicular to the direction of the linear polarization component to be extracted in the linear polarization component extracting unit and further carries out control so that the polarization state of the sampling light pulse to be inputted to the nonlinear medium becomes a linear polarization having an angle of 40 to 50 degrees with respect to the direction of the linear polarization to be controlled with respect to the light under measurement.

In this case, it is also appropriate that the polarization state control unit includes a first polarization control unit for converting the light under measurement into a linear polarization light, a second polarization control unit for converting the sampling light generated in the sampling light producing unit into a linear polarization light, and a monitor control unit for monitoring and controlling the directions of the linear polarization lights, undergoing the conversion in the first polarization control unit and the second polarization control unit, on the basis of the linear polarization component of the light under measurement extracted in the linear polarization component extracting unit.

In addition, it is also appropriate that the monitor control unit includes an initial setting unit for initially setting the direction of the linear polarization to be extracted in the linear polarization component extracting unit and the directions of the linear polarization lights undergoing the conversion in the first polarization control unit and the second polarization control unit.

Preferably, when the sampling light pulse is not inputted, the initial setting unit initially sets the direction of the linear polarization light undergoing the conversion in the first polarization control unit and the direction of the linear polarization to be extracted by the linear polarization component extracting unit so that the linear polarization component extracted by the linear polarization component extracting unit substantially becomes at a minimum, and initially sets the direction of the linear polarization light undergoing the conversion in the second polarization control unit to make an angle of 40 to 50 degrees with respect to the initially set direction of the linear polarization light undergoing the conversion in the first polarization control unit.

Still additionally, it is also acceptable that an optical filter is provided so as to flatten the wavelength characteristic of the light representative of the sampling result on the light under measurement from the sampling result outputting unit.

Yet additionally, it is also acceptable that a display unit is provided to receive the light representative of the sampling result on the light under measurement from the sampling result outputting unit for displaying a waveform of the light under measurement by sweeping the sampling result.

Moreover, it is preferable that the polarization state control unit carries out the control before the start of the measurement of the light under measurement.

Furthermore, in accordance with another aspect of the present invention, there is provided an optical waveform measuring apparatus comprising a sampling light outputting unit for, when a plurality of series of lights are objects of waveform measurement, outputting a plurality of sampling light pulses to sample the plurality of series of lights under measurement, a plurality of sampling result outputting units each for developing a nonlinear optical effect stemming from each of the plurality of series of lights under measurement and each of the plurality of sampling light pulses from the sampling light outputting unit to output a light corresponding to a result of the sampling of the light under measurement, and a polarization state control unit for, for making the waveform measurement using the lights outputted from the plurality of sampling result outputting units, individually controlling polarization states of the lights under measurement to be inputted to the sampling result outputting units on the basis of the lights from the sampling result outputting units.

Still furthermore, in accordance with a further aspect of the present invention, there is provided an optical waveform measuring apparatus comprising a sampling light outputting unit for, when a plurality of series of lights are objects of waveform measurement, outputting a shared sampling light pulse for sampling the plurality of series of lights under measurement, a sampling result outputting unit for developing a nonlinear optical effect stemming from the plurality of series of lights under measurement and the shared sampling light pulse from the sampling light outputting unit to output a light corresponding to a result of the sampling of each of the lights under measurement, and a polarization state control unit for, for making the waveform measurement using the light outputted from the sampling result outputting unit, individually controlling polarization states of the lights under measurement to be inputted to the sampling result outputting unit on the basis of power levels of the lights from the sampling result outputting unit.

Yet furthermore, in accordance with a further aspect of the present invention, there is provided an optical waveform measuring method comprising the steps of, for light waveform measurement, outputting a sampling light pulse to sample a light under measurement which is an object of the measurement, developing a nonlinear optical effect stemming from the light under measurement and the sampling light pulse to output a light corresponding to a sampling result on the light under measurement, and controlling polarization states of the light under measurement, which is the object of the measurement, and the sampling light pulse so that the light outputted as the sampling result has a predetermined linear polarization state.

In this case, it is also appropriate that the polarization state of the sampling light pulse is controlled so as to make an angle of 40 to 50 degrees with respect to a linear polarization state of the light to be outputted as the sampling result, and when the sampling light pulse is not inputted, the polarization state of the light under measurement which is the object of the measurement is controlled so that the light to be outputted as the sampling result substantially becomes at a minimum.

As described above, according to the present invention, the polarization state control unit can control the polarization state of a light under measurement to be inputted to the sampling result outputting unit to carry out the waveform measurement through the use of a light outputted from the sampling result outputting unit, which provides an advantage of removing the dependency of the generation of an intensity correlation signal light upon a polarization state of the light under measurement.

As a further advantage, the present invention can prevent the generation of the intensity correlation signal light from depending upon the polarization state of the light under measurement through the feedback control on the polarization state of the light under measurement and the feedback control on the polarization state of the sampling light pulse which are relatively simple control.

BRIEF DESCRIPTION OF THE DRAWINGS

FIG. 7 is a block diagram showing a configuration of an essential part of the optical waveform measuring apparatus according to the second embodiment of the present invention;

FIGS. 8A and 8B are illustrations useful for explaining an operation of an essential part of the optical waveform measuring apparatus according to the second embodiment of the present invention;

FIG. 9 is a block diagram showing a configuration of an essential part of the optical waveform measuring apparatus according to the second embodiment of the present invention;

DESCRIPTION OF THE PREFERRED EMBODIMENTS

Embodiments of the present invention will be described hereinbelow with reference to the drawings.

In addition to aforementioned object of the present invention, other technical problems, the measures for solving these technical problems and the effects thereof will become obvious from the disclosure of the following embodiments.

[A] Description of First Embodiment

[A-1] Configuration

Figure 1:
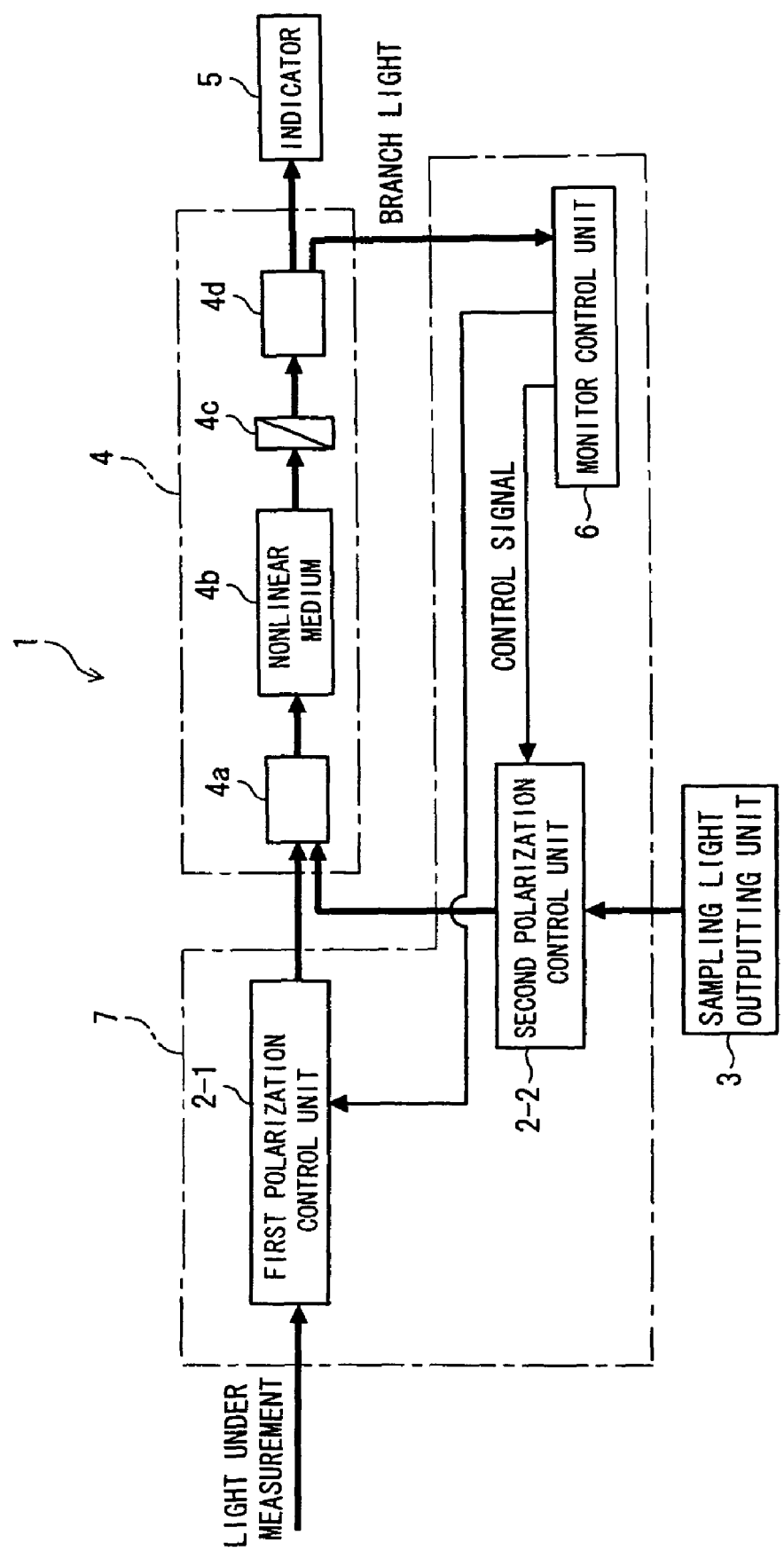
FIG. 1 is a block diagram showing an optical waveform measuring apparatus according to a first embodiment of the present invention.

FIG. 1 is a block diagram showing an optical waveform measuring apparatus according to a first embodiment of the present invention. The optical wave form measuring apparatus 1 shown in FIG. 1 is for measuring a waveform of light under measurement (light to be measured) and, concretely, has a function to display a waveform by means of sampling. In this case, the optical waveform measuring apparatus 1 is made up of a first polarization control unit 2-1, a second polarization control unit 2-2, a sampling light outputting unit 3, a sampling result outputting unit 4, a wave form indicator 5 and a monitor control unit 6.

In this configuration, the sampling light outputting unit 3 is made to output a sampling light pulse for sampling the aforesaid light under measurement, and a sampling light to be outputted from the sampling light outputting unit 3 has a pulse width narrower than the light under measurement and further has a period approximately equal to or longer than a repetition period of the light under measurement, i.e., a sampling frequency having a repetition frequency substantially lower than that of the light under measurement.

Figure 4:
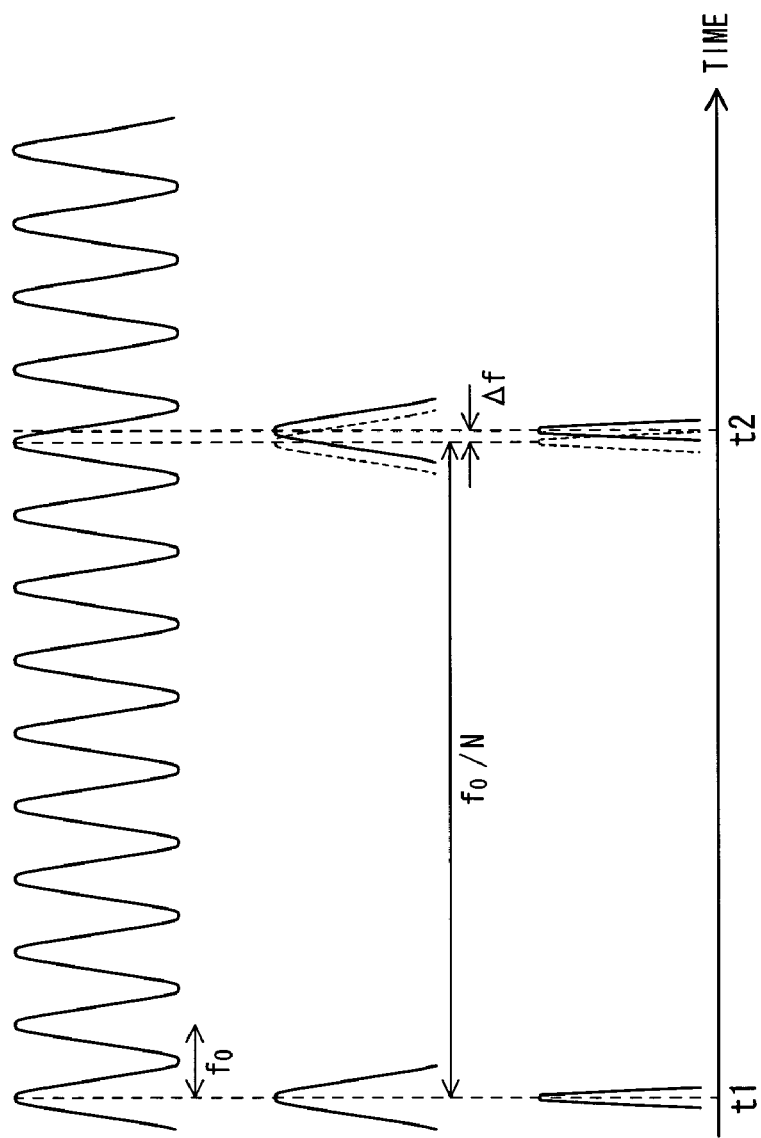
FIGS. 4A to 4C are illustrations useful for explaining an operation of the second embodiment of the present invention.

As will be mentioned later, when a light under measurement having a repetition frequency $f_0$ as shown in FIG. 4A is inputted, the sampling light outputting unit 3 is made to output a sampling light pulse having a pulse width narrower than the light under measurement and having a sampling frequency $f_1$ ($=f_0/N+\Delta f$) approximately equal to or lower than the repetition frequency $f_0$ of the light under measurement as shown in FIG. 4C, where N designates an integer equal to or more than 1, and this also applies to the following description.

The first polarization control unit 2-1 is made to place the polarization state of the inputted light under measurement into a linear polarization under control of the monitor control unit 6 to be mentioned later. Moreover, the sampling light outputting unit 3 is made to output a sampling light pulse for sampling the aforesaid light under measurement, i.e., for sampling a light waveform which is an object of measurement. Still moreover, the second polarization control unit 2-2 is made to place the polarization state of the sampling light pulse from the sampling light outputting unit 3 into a linear polarization under control of the monitor control unit 6 to be mentioned later.

The sampling result outputting unit 4 is made to develop (produce) a nonlinear optical effect on the basis of the light under measurement placed into the linear polarization in the polarization control unit 2-1 and the sampling light pulse placed into the linear polarization in the polarization control unit 2-2 for outputting a light corresponding to a sampling result on the light under measurement, and it is composed of a directional couplers 4a, 4d, a nonlinear medium 4b and a polarizer 4c.

The directional coupler 4a is for multiplexing the light under measurement from the polarization control unit 2-1 and the sampling light pulse from the polarization control unit 2-2. The nonlinear medium 4b is made to develop an optical Kerr effect and an optical parametric effect as a nonlinear effect (nonlinear optical effect) stemming from the light under measurement and the sampling light pulse multiplexed in the directional coupler 4a, thereby outputting a light representative of a sampling result on the light under measurement.

That is, the nonlinear medium 4b is made to output an intensity correlation signal light relative to the light under measurement and the sampling light pulse. Incidentally, for example, the aforesaid nonlinear medium 4b can be constructed with an optical fiber. Moreover, the polarizer 4c is for extracting a linear polarization component forming a light component developing due to the aforesaid nonlinear effect in the nonlinear medium 4b. Concretely, in a state where the sampling light pulse is not inputted to the nonlinear medium 4b, even if the light under measurement is inputted to the nonlinear medium 4b, the light component to be extracted from the polarizer 4c becomes at a minimum, and difficulty is experienced in extracting a light-under-measurement component practically. On the other hand, when the sampling light pulse and the light under measurement are inputted thereto, the light-under-measurement component subjected to the nonlinear effect can be extracted by the polarizer 4c because of the inputting of the sampling light pulse.

Moreover, the directional coupler 4d divides (branches) the light component, extracted by the polarizer 4c so that one is outputted to the indicator 5 for the display of the light waveform and the other is outputted to the monitor control unit 6. Therefore, the aforesaid polarizer 4c and directional coupler 4d constitute a linear polarization component extracting unit for extracting a linear polarization component of the light under measurement, whose polarization state has changed due to the nonlinear optical effect developing in the nonlinear medium 4d, for the waveform measurement. The arrangement forming the linear polarization component extracting unit is not limited to this, but it is also appropriate that, for example, a Faraday rotator is located at the former stage of a polarizer, or a polarization beam splitter (PBS) is employed therefor. Moreover, as disclosed in the non-patent document 2, although the wavelength dependency of the generation efficiency of the intensity correlation signal light is low in the wavelength range between 1530 nanometer and 1565 nanometer, which is called the C-band region, for the further removal of this wavelength dependency, it is also appropriate that, in the sampling result outputting unit 4, an optical filter (wavelength characteristic flattening filter) is disposed before or after the polarizer 4c, or after the directional coupler 4d. This filter can make the generation efficiency of the intensity correlation independent of the wavelength of the light under measurement. For example, when, as this filter, several filters having different wavelength characteristics are combined with each other or a fiber Bragg grating is used, an arbitrary wavelength transmission characteristic is obtainable. It is obvious that a person skilled in the art can easily realize such filters.

The monitor control unit 6 is for monitoring and controlling the direction of a linear polarization light, converted in the first polarization control unit 2-1 and the second polarization control unit 2-2, on the basis of the linear polarization component of the light under measurement extracted by the polarizer 4c. Concretely, the linear polarization component of the light component developing the nonlinear effect in the nonlinear medium 4b and passing through the polarizer 4c is inputted through the directional coupler 4d, and the first polarization control unit 2-1 and the second polarization control unit 2-2 are feedback-controlled so that the linear polarization component reaches a maximum. In this case, even if it is slightly shifted from the maximum, no serious problem arises in terms of the measurement.

That is, in the monitor control unit 6, the first polarization control unit 2-1 is controlled so that the polarization state of the light under measurement inputted to the nonlinear medium 4b becomes a linear polarization substantially perpendicular to the direction of the linear polarization component to be extracted by the polarizer 4c, and the second polarization control unit 2-2 is controlled so that the polarization state of the sampling light pulse inputted to the nonlinear medium 4b becomes a linear polarization making an angle of 40 to 50 degrees, preferably 45 degrees, with reference to the direction of the linear polarization to be controlled with respect to the light under measurement. In this case, the control of the second polarization control unit 2-2 is implemented so that the polarization state of the sampling light pulse is set at an approximately intermediate angle between the direction of the linear polarization to be controlled with respect to the light under measurement and the direction of the linear polarization component to be extracted in the polarizer 4c.

Therefore, the above-mentioned first polarization control unit 2-1, second polarization control unit 2-2 and polarization state control unit 7 constitute a monitor control unit 6 capable of controlling the polarization states of the light under measurement and the sampling light pulse inputted to the sampling result outputting unit 4 so that the light outputted from the sampling result outputting unit 4 has a predetermined linear polarization state.

In this connection, with regard to the polarization state of the sampling light pulse, if it is possible to stably output a linear polarization having an angle of 40 to 50 degrees, preferably 45 degrees, with reference to a linear polarization to be extracted by the polarizer 4c, the feedback control to be executed through the second polarization control unit 2-2 and the monitor control unit 6 is properly omissible therefrom.

The indicator 5 is for converting the light corresponding to the sampling result, outputted from the directional coupler 4d organizing the sampling result outputting unit 4, into an electric signal and sweeping the converted electric signal indicative of the sampling result, thereby displaying the waveform of the light under measurement.

[A-2] About Generation of Intensity Correlation Signal Light by Nonlinear Medium 4b Secondly, a description will be given hereinbelow of the generation of an intensity correlation signal light using an optical fiber as the nonlinear medium 4b constituting the optical waveform measuring apparatus 1 thus constructed according to the first embodiment, while explaining an optical Kerr switch which is a technique related to the present invention.

As one of the nonlinear effects developing within an optical fiber, there is a four-wave mixing effect whose response time is in the order of tens fem to second. This is a phenomenon that, when a pump light having the same wavelength as the zero-dispersion wavelength of an optical fiber and a signal light having a wavelength different that of the pump light are inputted to the optical fiber, a third light, i.e., an idler light is generated. The intensity of the idler light is in proportion to the product of the peak power of the signal light and the square of the peak power of the pump light and, hence, an intensity correlation signal light is optically obtainable owing to the four-wave mixing effect.

In response to an increase in pump light intensity, an optical parametric amplification phenomenon occurs at the same time. That is, the energy of the pump light is distributed to the signal light and the third idler light so that the intensity correlation signal light is efficiently obtainable. This amplification phenomenon also applies to the signal light. That is, when this amplification component can be separated from the signal light incident on the optical fiber, the intensity correlation signal light having the same wavelength as the incident signal light wavelength is obtainable.

For example, in the case of observing the signal light having any wavelength in the C-band region, the wavelength of the pump light is required to be set out of the C-band region and the idler light naturally appears out of the C-band and, hence, the employment of this light as the intensity correlation signal light requires optical parts out of the C-band region, which leads to an expensive optical sampling apparatus. In view of this, it is important to obtain the intensity correlation signal light having the same wavelength as that of the signal light.

In this situation, the above-mentioned separation becomes feasible by the employment of an optical Kerr switch utilizing the optical Kerr effect which is a different nonlinear effect. The optical Kerr switch is a switch comprising a nonlinear medium and a polarizer designated at the reference numerals $4b$ and $4c$ in the sampling light outputting unit 4 according to the first embodiment, and the polarization state of the signal light is set so that the signal light incident on this switch does not pass through the polarizer.

In addition, a control light of a linear polarization making an angel of 40 to 50 degree, preferably 45 degrees, with respect to the polarization of the signal light is incident thereon, the polarization state of the signal light varies due to the control light and only the intensity correlation signal light component passes through the polarizer. Therefore, the optical Kerr switch can provide the intensity correlation signal light having the same wavelength as that of the incident signal light. Incidentally, the optical Kerr switch can show a very high speed response because of an all-optical switch. Naturally, also in this optical Kerr switch, in comparison with a case of the employment of a nonlinear crystal such as KTP, in terms of an inputted signal light pulse, an intensity correlation signal light is attainable with high conversion efficiency.

As an optical fiber to be used as a nonlinear medium constituting the optical Kerr switch, there is a step index type optical fiber to be commonly used for the optical fiber transmissions. This has widely been put to use and the employment thereof can realize it at a low cost. Moreover, when a refractive index is changed to reduce the effective core area and the core is doped with germanium to increase the nonlinear refractive index, it is possible to use a step index type silica-based optical fiber having an improved nonlinearity coefficient, a photonic crystal fiber having a nonlinearity coefficient enhanced by realizing a small effective core area which cannot be realized by a step index type optical fiber, and a high-nonlinearity optical fiber made of a material higher in nonlinear refractive index than silica. The employment of the optical fiber having an increased nonlinearity coefficient can shorten the length of the optical fiber required for generating the intensity correlation signal light efficiently, thus realizing a compact and stable optical sampling system.

Meanwhile, an optical switch, made to provide an intensity correlation signal light by a combination of the aforesaid parametric amplification phenomenon and optical Kerr switch, can achieve a conversion efficiency of 1 or more owing to the amplification function. Therefore, when this optical Kerr switch is applied to an apparatus designed to generate an intensity correlation signal light, it is possible to greatly enhance a relatively low conversion efficiency of a KTP crystal or the like.

In the details of this optical Kerr switch, as disclosed in the aforesaid non-patent document 2, in terms of a signal under measurement in the entire C-band region, this switch successfully achieved the generation of an intensity correlation signal light having power approximately six times greater than the power of the light under measurement incident thereon. Considering that the conversion efficiency in the case of the employment of a conventional KTP crystal or the like is $10^{-4}$, it is found that the conversion efficiency of the optical Kerr switch is extremely high.

In this embodiment, the configuration of the sampling light outputting unit 4 including the nonlinear medium $4b$ and the polarizer $4c$ produces a linear polarization so as to make an angle of 40 to 50 degrees, preferably 45 degrees, between the polarization states of the light under measurement and the sampling light pulse, inputted to the nonlinear medium $4b$, through the use of the first polarization control unit 2-1, the second polarization control unit 2-2 and the monitor control unit 6 for eliminating the polarization dependency of the light under measurement, while enhancing the generation efficiency of the intensity correlation signal light as well as the above-mentioned optical Kerr switch.

Figure 2:
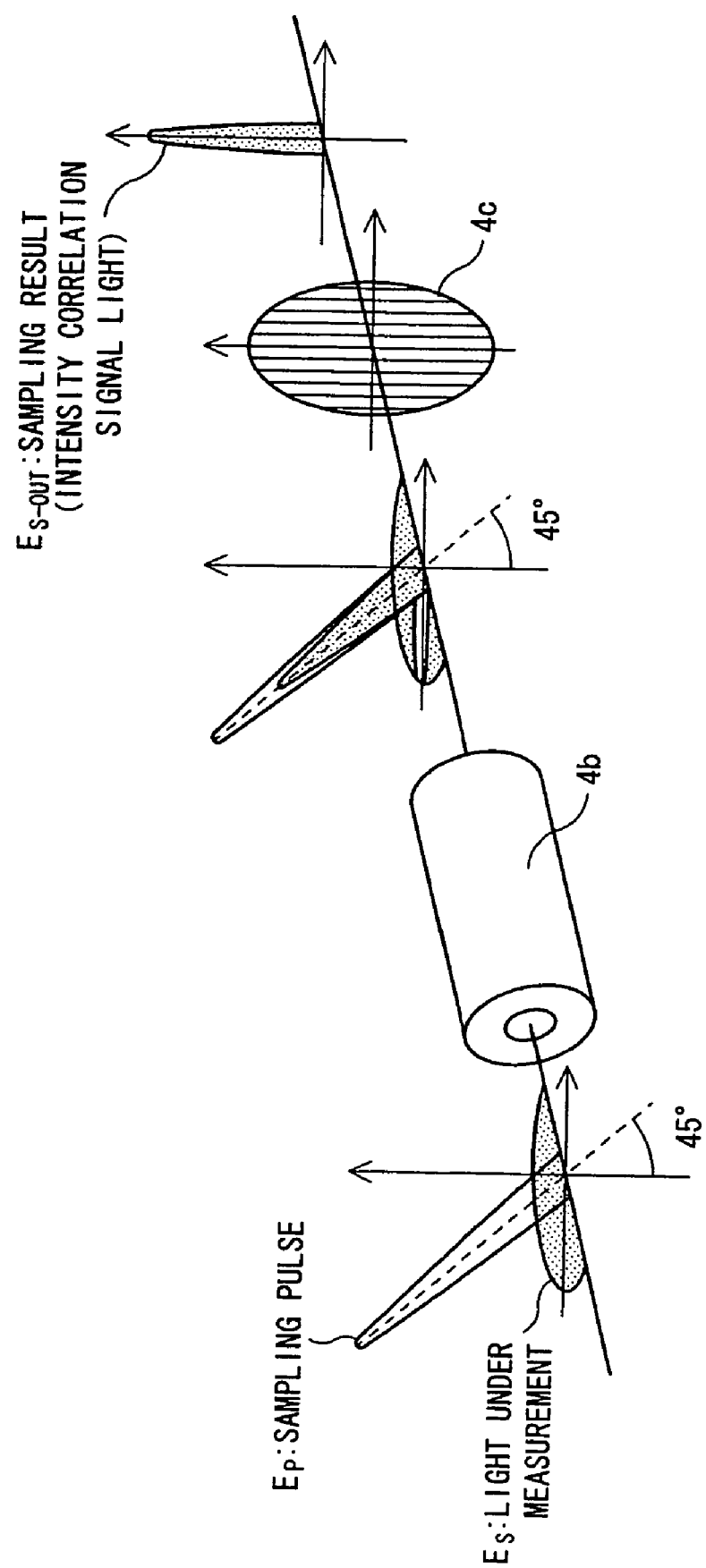
FIG. 2 is an illustration useful for explaining an operation of the first embodiment of the present invention.

That is, for example, the first polarization control unit 2-1 converts the light under measurement to be inputted to the nonlinear medium $4b$ into a linear polarization Es shown in FIG. 2, and the second polarization control unit 2-2 converts the sampling light pulse to be inputted to the nonlinear medium $4b$ into a sampling light pulse Ep which makes an angle of 40 to 50 degrees, preferably 45 degrees, with respect to Es shown in FIG. 2, thus outputting a light component Es1 (having a linear polarization component approximately identical to the sampling light pulse Ep) having an intensity correlation with the sampling light pulse. Moreover, of this linear polarization Es1, a component perpendicular to the linear polarization component Es of the light under measurement inputted to the nonlinear medium $4b$ passes through the polarizer $4c$, thereby obtaining an intensity correlation signal light Es-out (having the same wavelength as that of the light under measurement) corresponding to a sampling result.

[A-3] Effects

In the optical waveform measuring apparatus 1 according to the first embodiment of the present invention thus constructed, for the measurement of a light waveform, the sampling light pulse outputting unit 3 outputs a sampling light pulse for sampling a light which is an object of measurement, and the nonlinear medium $4b$ constituting the sampling result outputting unit 4 develops the nonlinear optical effect stemming from the light under measurement and the sampling light pulse.

An intensity correlation signal light due to the light under measurement and the sampling light pulse is outputted through the polarizer $4c$ as a light indicative of the sampling result on the light under measurement. The indicator 5 converts the light of the sampling result into an electric signal and sweeps the sampling result converted into the electric signal, then displaying the waveform of the light under measurement for accomplishing the observation and measurement of the waveform of the light under measurement on the basis of the waveform displayed thereon.

In the optical waveform measuring apparatus 1, prior to the measurement of a waveform of a light under measurement as mentioned above, the monitor control unit 6 controls the first polarization control unit 2-1 and the second polarization control unit 2-2 to control the polarization states of the light which is an object of measurement and a sampling light pulse so that the light to be outputted as a sampling result shows a linear polarization state with an optimum level (for example, maximum level).

That is, the polarization state of the sampling light pulse is controlled to establish a linear polarization having an angle of 40 to 50 degrees, preferably 45 degrees, with respect to the linear polarization state of the light to be outputted as the sampling result, and the polarization state of the light being an object of measurement is controlled so that, when the sampling light pulse is not inputted thereto, the light to be outputted as the sampling result becomes substantially at a minimum.

In other words, in the state of the non-inputting of the sampling light pulse, while the linear polarization state is made in the direction of inhibiting the output through the polarizer 4c to the indicator 5, in a case in which the light under measurement, together with the sampling light pulse, is inputted to the optical fiber 4b, the polarization state of a portion where the light under measurement and the sampling light pulse overlaps in time with each other rotates due to the optical Kerr effect, which enables the light whose polarization state has rotated to be extracted as an intensity correlation signal light through the polarizer 4c.

In addition, the intensity correlation signal light to be extracted as a sampling result is outputted with an efficiency higher than that of a conventional technique owing to the parametric amplification phenomenon and a polarization state control unit 7 controls the polarization states of the light under measurement and the sampling light pulse, so the waveform measurement becomes feasible even if the light under measurement is in an arbitrary polarization state.

As described above, according to the first embodiment of the present invention, since the polarization state of the light under measurement to be inputted to the sampling result outputting unit 4 can be controlled so that the polarization state control unit 7 can accomplish the waveform measurement through the use of the light outputted from the sampling result outputting unit 4, there is an advantage that the generation of the intensity correlation signal light does not depend upon the polarization state of the light under measurement while employing the single nonlinear medium 4b without using a complicated polarization diversity arrangement.

In addition, there is an advantage of eliminating the polarization dependency of the intensity correlation signal light through a relatively simple control, i.e., the feedback control on the polarization state of the light under measurement and the feedback control on the polarization state of the sampling light pulse.

Still additionally, it is possible to faithfully observe the waveform of the light under measurement in an arbitrary polarization state with a high time resolution which is not realizable by an oscilloscope based on electric sampling and to observe a very-high-rate signal light easily and stably, thereby accelerating a communication system using a very-high-rate signal light and the research and development of the optical signal processing technology. Yet additionally, it is also applicable to a monitoring apparatus such as a signal quality monitor, so it is expectable to put an easy optical signal monitor into practical use.

[B] Description of Second Embodiment

[B-1] Construction

Figure 3:
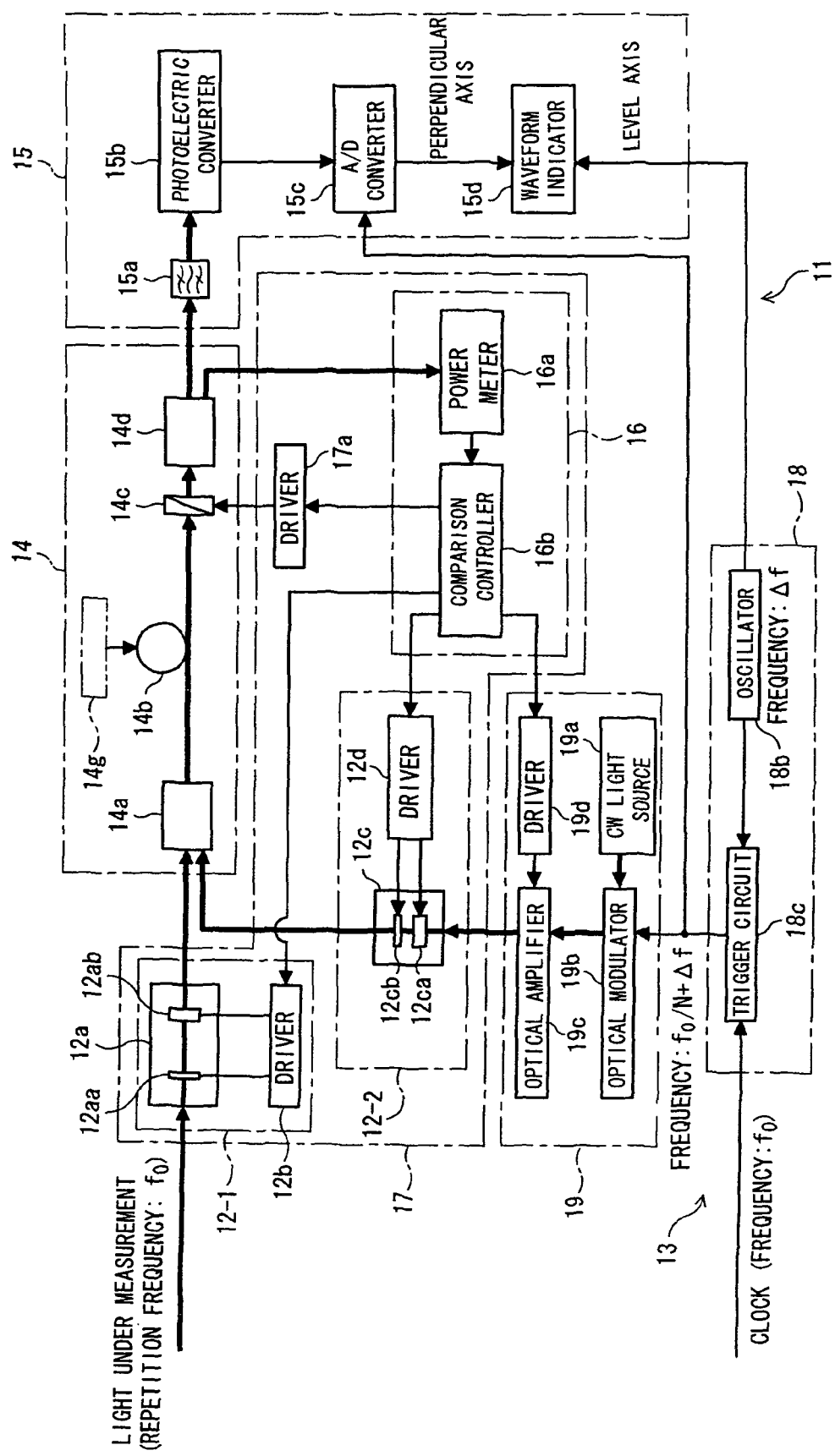
FIG. 3 is a block diagram showing an optical waveform measuring apparatus according to a second embodiment of the present invention.

FIG. 3 is a block diagram showing an optical waveform measuring apparatus 11 according to a second embodiment of the present invention. The optical waveform measuring apparatus 11 shown in FIG. 3 is designed to further develop each component of the above-described optical waveform measuring apparatus 1 according to the first embodiment. That is, the optical waveform measuring apparatus 11 according to the second embodiment is also made up of a first polarization control unit 12-1, a second polarization control unit 12-2, a sampling light outputting unit 13, a sampling result outputting unit 14, an indicator 15 and a monitor control unit 16.

In this configuration, the sampling light outputting unit 13 is for supplying a sampling light pulse through the first polarization control unit 12-1 to the sampling result outputting unit 14 and, as shown in FIG. 3, it is composed of a frequency generating unit 18 and a sampling light producing unit 19. The frequency generating unit 18 generates a signal having a sampling frequency $f_1$ approximately equal to or longer than a repetition period of a light under measurement, i.e., having a low repetition frequency. The sampling light producing unit 19 produces a sampling light pulse by carrying out an optical modulation on the basis of the sampling frequency generated from the frequency generating unit 18.

That is, in a case in which the light having the repetition frequency $f_0$ (for example, the repetition frequency $f_0$=approximately 160 GHz) shown in FIG. 4A is an object of measurement (light under measurement), the frequency generating unit 18 receives a clock signal synchronized with this light under measurement to frequency-shift the received clock signal with a sweep signal, thereby outputting it as a sampling frequency signal.

Concretely, as shown in FIG. 4B, a frequency $f_1$ ($=f_0/N+\Delta f$) lower than the repetition frequency $f_0$ of the light under measurement is outputted as a sampling frequency signal and, in the second embodiment, the frequency generating unit 18 is composed of an oscillator 18b and a trigger circuit 18c.

The oscillator 18b is made to generate a frequency $\Delta f$ for sweeping the light under measurement, and constitutes a sweep signal producing unit for producing a sweep signal for sweeping the light under measurement. Incidentally, the frequency $\Delta f$ can take a positive or negative frequency signal.

The trigger circuit 18c is synchronized with the light under measurement to receive a clock signal with a frequency $f_0$ which is the repetition frequency thereof, and receives the frequency $\Delta f$ from the aforesaid oscillator 18b to produce the aforesaid sampling frequency signal $f_1$. In other words, the trigger circuit 18c constitutes a frequency shifting unit to frequency-shift the received clock signal with the sweep signal from the oscillator 18b for producing a sampling frequency signal.

In addition, in FIG. 3, the sampling light producing unit 19 is composed of a continuous light source 19a for outputting a continuous light (CW: Continuous Wave), an optical modulator 19b for modulating the continuous light from the continuous light source 19a with (on the basis of) the sampling frequency $f_1$ generated from the trigger circuit 18c constituting the frequency generating unit 18 to output a sampling light pulse, an amplifier 19c for amplifying the sampling light pulse outputted from the optical modulator 19b and a driver 19d for driving the amplifier 19c. Incidentally, if the power of the sampling light pulse to be outputted from the optical modulator 19b is a power needed for the sampling result outputting unit 14, the amplifier 19c is omissible.

For example, in a case in which a signal with a pulse width shown in FIG. 4B is received as the sampling frequency signal generated from the aforesaid frequency generating unit 18, the optical modulator 19b is made to output a sampling light pulse with a pulse width narrower than the pulse width of the sampling frequency signal from the frequency generating unit 18 as shown in FIG. 4C.

The optical amplifier 19c is for amplifying the sampling light pulse from the optical modulator 19b when needed, and if the optical amplifier 19c is independently controlled by implementing, for example, the automatic power control through the use of the driver 19d so that the output power is maintained at a constant value at all times, the control of the entire apparatus becomes simple. Incidentally, the disposition of the optical modulator 19b and the optical amplifier 19c can also be made in the opposite sequence.

The first polarization control unit 12-1 is composed of a first polarization controller 12a and a first driver 12b. In the second embodiment, the first polarization controller 12a includes a quarter-wave plate 12aa and a half-wave plate 12ab to place the inputted light under measurement through the quarter-wave plate 12aa and the half-wave plate 12ab into a linear polarization state.

The first driver 12b is made to set each of the crystal axis angles of the wave plates 12aa and 12ab of the first polarization controller 12a relative to the light under measurement to be incident thereon under control of the monitor control unit 16 which will be mentioned later. That is, the conversion into a linear polarization is feasible when the light under measurement passes through the wave plates 12aa and 12ab set in crystal axis angle. At this time, the angle setting on the wave plates 12aa and 12ab of the first driver 12b enables the direction of the linear polarization to be controlled to be set when the light under measurement inputted to the first polarization controller 12a is converted into the linear polarization.

Likewise, the second polarization control unit 12-2 is composed of a second polarization controller 12c and a second driver 12d. The second polarization controller 12c also includes a quarter-wave plate 12ca and a half-wave plate 12cb to place the sampling light pulse inputted from the sampling light outputting unit 3 through the quarter-wave plate 12ca and the half-wave plate 12cb into a linear polarization state.

The first driver 12d is made to set each of the crystal axis angles of the wave plates 12ca and 12cb of the second polarization controller 12c relative to the sampling light pulse to be incident thereon under control of the monitor control unit 16 which will be mentioned later. That is, the conversion into a linear polarization is feasible when the sampling light pulse passes through the wave plates 12ca and 12cb set in crystal axis angle. At this time, the angle setting on the wave plates 12ca and 12b c of the second driver 12d enables the direction of the linear polarization to be setting-controlled when the light under measurement inputted to the second polarization controller 12c is converted into the linear polarization.

As the aforesaid first and second polarization controllers 12a and 12c, in addition to the configuration using the above-mentioned wave plates 12aa, 12ab, 12ca and 12cb, it is also possible to use a well-known configuration such as a squeezer type in which a stress is applied to a side portion of an optical fiber, a type using a lithium niobate (LN) waveguide or a type using a Faraday rotator. Moreover, the configuration of the first and second drivers 12b and 12d can properly be made in accordance with the configuration of the aforesaid first and second polarization controllers 12a and 12c.

In this connection, in a case in which the type comprising the combination of wave plates is used as in the second embodiment, the control for changing the light under measurement in an arbitrary polarization state to a desired polarization state becomes easier in comparison with other configurations. Moreover, since the squeezer type shows an extremely small insertion loss, in comparison with the other configurations, it enables the observation of even a light under measurement having a low power which cannot be observed due to noises superimposed on a signal during the processing by an photoelectric converter 15b of the indicator 15 or the like and enhances the allowable incidence power extremely because of being constructed with an optical fiber. In the case of the employment of the LN waveguide, since the response speed is extremely high in comparison with the other configurations, a desired polarization state is quickly attainable. Also in the case of the employment of the Faraday rotator, the polarization state can be set at a high speed.

Moreover, the sampling result outputting unit 14 is composed of a directional coupler 14a, an optical fiber 14b functioning as a nonlinear medium, a polarizer 14c and a directional coupler 14d which are similar to those (see reference numerals 4a to 4d) of the above-mentioned sampling result outputting unit 4 according to the first embodiment and, with respect to an multiplexed light of a light under measurement and a sampling light pulse inputted through the directional coupler 14a, it can output an intensity correlation signal light as a sampling result as in the case of the above-mentioned [A-2]. In the second embodiment, the direction of a linear polarization outputted from the polarizer 14c can be set by a driver 17a constituting a polarization control unit which will be mentioned later.

That is, according to the relationship between the direction of the linear polarization set by the driver 17a and outputted from the polarizer 14c and the directions of the linear polarizations of the light under measurement and the sampling light pulse set through the first and second drivers 12b and 12d, the light (i.e., intensity correlation signal light) developing the optical Kerr effect as a nonlinear optical effect in the optical fiber 14b is obtainable as a sampling result on the light under measurement.

In this connection, for example, when an optical fiber type is used as the aforesaid directional couplers 14a and 14d, the configuration becomes simple and the connectivity with other parts becomes high. However, all the other configurations such as a spatial coupler using a dichroic mirror are available as long as they have a function to couple two lights in one optical fiber.

In addition, if a temperature adjusting unit 14g made to adjust the temperature of the optical fiber 14b stably is provided in the sampling result outputting unit 14, the optical fiber 14b does not suffer the influence of external temperature variation and, hence, even if the time variations of the polarization states of the light under measurement and the sampling light pulse occur in the optical fiber 14b due to the external temperature variation and the light incidence, they are suppressible.

Furthermore, the monitor control unit 16 is for monitoring and controlling the directions of linear polarization lights, respectively converted in the first polarization controller 12a and the second polarization controller 12b, by controlling the first driver 12b and the second driver 12d on the basis of a linear polarization component of a light under measurement extracted through the polarizer 14c and the directional coupler 14d. Accordingly, this monitor control unit 16 includes a power meter 16a and a comparison controller 16b.

The power meter 16a is made to measure a power level of the light under measurement extracted through the polarizer 14c and the directional coupler 14d, while the comparison controller 16b makes a comparison between the measurement result from the power meter 16a and a reference value to make a decision on the polarization states of the light under measurement and the sampling light pulse inputted to the optical fiber 14b, thereby controlling the first and second drivers 12b, 12d and the drivers 17a, 19d.

That is, through the control on the first and second drivers 12b and 12d by the monitor control unit 16, the polarization state (see Es in FIG. 2) of the light under measurement inputted to the optical fiber 14b is controlled to be a linear polarization (see Es-out in FIG. 2) substantially perpendicular to the direction of the linear polarization component to be extracted by the polarizer 14c and the directional coupler 14d, and the polarization state of the sampling light pulse inputted to the optical fiber 14b is controlled to be a linear polarization (see Ep in FIG. 2) which makes an angle of 40 to 50 degrees, preferably 45 degrees, with reference to the direction of the linear polarization to be controlled with respect to the light under measurement. In this case, the control is implemented so that the linear polarization has an approximately intermediate angle between the direction of the linear polarization to be controlled with respect to the light under measurement and the direction of the linear polarization component to be extracted through the polarizer 14c and the directional coupler 14d.

In addition to the directions of the linear polarizations of the light under measurement and the sampling light pulse inputted to the optical fiber 14b, when the relationship between the directions of the linear polarizations to be extracted through the polarizer 14c and the directional coupler 14d is prescribed, it is possible to carry out an appropriate waveform measurement at all times irrespective of the polarization state of the light under measurement to be inputted.

Therefore, the above-mentioned first polarization control unit 12-1, second polarization control unit 12-2, monitor control unit 16 and driver 17a constitute a polarization state control unit 17 capable of controlling a polarization state of a light under measurement inputted to the sampling result outputting unit 14 on the basis of a light outputted from the sampling result outputting unit 14 for carrying out the waveform measurement through the use of the light outputted from the sampling result outputting unit 14.

In addition, prior to the measurement of a light waveform in the optical waveform measuring apparatus 11, as an initial setting operation in the aforesaid monitor control unit 16 which will be mentioned later, after the second driver 12d and the driver 17a are setting-controlled so as to prescribe the polarization state of the sampling light pulse and the direction of the linear polarization to be extracted in the polarizer 14c in a state where no light under measurement is inputted thereto, the first driver 12a is controlled so that the polarization state of the light under measurement inputted becomes a linear polarization state perpendicular to the direction of the linear polarization to be extracted in the polarizer 14c. In this case, the monitor control unit 16 makes an initial setting unit for initially setting the direction of the linear polarization to be extracted in the polarizer 14c and the directions of the linear polarization lights converted in the first polarization control unit 12-1 and the second polarization control unit 12-2.

The indicator 15 is for converting a light indicative of a sampling result outputted from the directional coupler 14d constituting the sampling result outputting unit 14 into an electric signal and further for sweeping the converted electric signal forming the sampling result, thereby displaying the waveform of the light under measurement. It is composed of a wavelength filter 15a, a photoelectric converter 15b, an A/D converter 15c and a waveform indicator 15d.

The wavelength filter 15a is for removing a wavelength component of the sampling light pulse with respect to the light outputted from the directional coupler 14d to derive a wavelength component of the light under measurement. This wavelength filter 15a can be constructed with a dielectric multi-layer band-pass filter. This enables the efficient removal of the sampling light pulse. Moreover, in the case of a band rejection filter for inhibiting the transmission with regard to only the sampling light pulse, such as the employment of a fiber Bragg grating, it is possible to easily observe the waveform of the light under measurement having an arbitrary wavelength without requiring external control.

In addition, in a case in which the sampling light pulse is set in L-band or S-band, even in the case of the employment of a C/L band separation fiber demultiplexer, it is possible to observe the light under measurement having an arbitrary wavelength in the entire C-band without requiring the external control, and to achieve the enhancement of performance of the apparatus. Still additionally, in a case in which an optical amplifier is interposed therebetween in order to amplify the power of the intensity correlation signal light, for example, if the wavelength of the light under measurement is in the C-band and the wavelength of the sampling light pulse is in the L-band or vice versa, that is, when the wavelength bands of the light under measurement and the sampling light pulse are different from each other, the employment of an optical amplifier made to amplify the wavelength band of an optical signal related to the light under measurement eliminates the need for the above-mentioned wavelength filter 15a because this amplifier has no gain in the wavelength band of the sampling light pulse.

Moreover, the photoelectric converter 15b constituting the above-mentioned indicator 15 is for converting an intensity correlation signal light indicative of a sampling result, wherein the wavelength component of the light under measurement passes through the wavelength filter 15a, into an electric signal, and the A/D converter 15c is for converting the amplitude of the electric signal from the photoelectric converter 15b into a digital signal through the use of the sampling frequency signal $f_1$ outputted from the aforesaid trigger circuit 18c. The waveform indicator 15d is made to perform the display of the waveform of the light under measurement with the digital signal from the A/D converter 15c as a vertical axis signal and the sweep signal $\Delta f$ from the oscillator 18b as a horizontal axis signal.

In this connection, in the circuit forming the above-mentioned A/D converter 15c and waveform indicator 15d of the indicator 15, the repetition period of the sampling light pulse is obtained as an operable bandwidth for the display of the waveform of the light under measurement. That is, if the repetition period of the sampling light pulse becomes longer, the circuit bandwidth requirement to be obtained as the aforesaid operable band is accordingly relaxed, which enables the cost reduction of these devices. When the sampling frequency is obtained by 1/N-dividing the clock signal (repetition frequency $f_0$) synchronized with the light under measurement, the cost of the configuration of the A/D converter 15c and the waveform indicator 15d is reducible.

Figure 5:
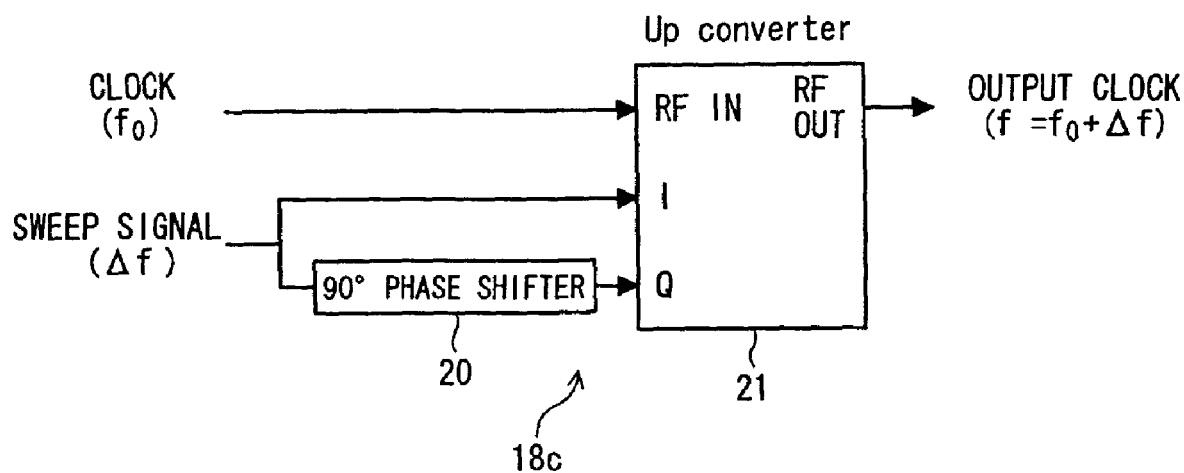
FIG. 5 is a block diagram showing an essential part of the optical waveform measuring apparatus according to the second embodiment of the present invention.

Meanwhile, FIG. 5 is an illustration of one example of the aforesaid trigger circuit 18c. The trigger circuit 18c shown in FIG. 5 is made up of a 90°-phase shifter 20 and an up-converter 21 and is made to output a sampling frequency $f_1$ for N=1. That is, the 90°-phase shifter 20 phase-shifts the frequency signal $\Delta f$ from the oscillator 18b by 90 degrees. Moreover, the up-converter 21 receives the frequency signal $\Delta f$ from the oscillator 18b as I input, the frequency signal $\Delta f$ phase-shifted in the 90°-phase shifter 20, as Q input, and the clock signal $f_0$ synchronized with the light under measurement to output, as the sampling frequency $f_1$, a sideband frequency of an upper side band having the repetition frequency $f_0+\Delta f$.

Figure 6:
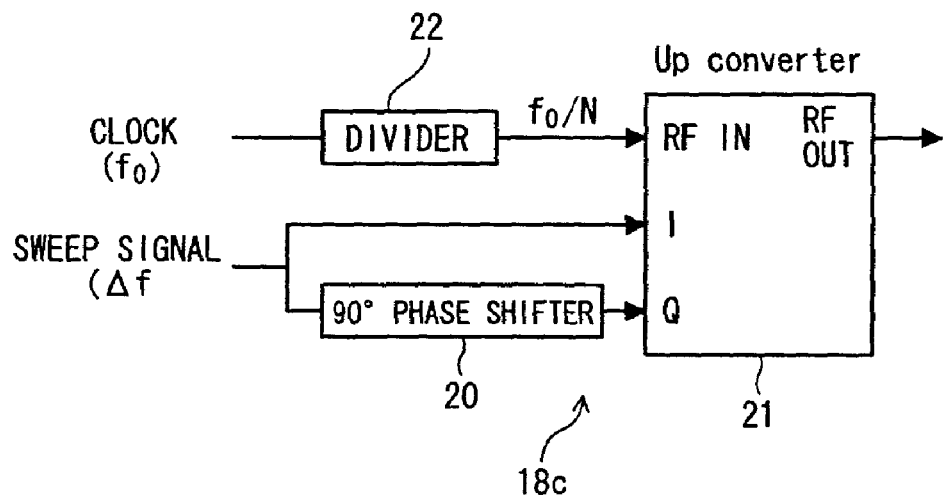
FIG. 6 is a block diagram showing an essential part of the optical waveform measuring apparatus according to the second embodiment of the present invention.

FIG. 6 is an illustration of another example of the trigger circuit 18c. In addition to the frequency shifting configuration shown in FIG. 5, the trigger circuit 18c shown in FIG. 6 includes a divider 22 for N-dividing the frequency $f_0$ down.

As shown in FIG. 7, the divider 22 is composed of a power divider 23, a prescaler 24, a D flip-flop (DFF) 25, a phase shifter 26 and an AND gate 27.

That is, the inputted clock $f_0$ (see fin in FIG. 8A) is power-divided by the power divider 23, and one clock signal $f_0$ is divided into a sine wave with a repetition frequency $f_0/N$ in the prescaler 24. The D flip-flop 25 receives the division result as data input and the other clock $f_0$, power-divided in the power divider 23, as clock input to output them as data and logical inverted data. Moreover, the timings of the data and logical inverted data to be outputted from the D flip-flop 25 are shifted by $1/f_0$ (s) through the use of the phase shifter 26, and they are inputted to the AND gate 27, thereby providing a frequency signal with a time width of $1/f_0$ (s) with the repetition frequency being $f_0/N$, as shown in FIG. 8B.

Thus, when the signal with the repetition frequency of $f_0/N$, and the time width of $1/f_0$ (s), outputted from the divider 22, is frequency-shifted with the frequency signal (sweep signal) $\Delta f$ from the oscillator 18b, the sampling frequency signal $f_1 = f_0/N + \Delta f$ shown in FIG. 4B can be outputted as the output of the frequency generating unit 18 with the width of the clock signal $f_0$ being maintained as the time width. Since the sampling frequency signal can be outputted in a state where the time width is maintained, a sampling light pulse capable of sampling the waveform of the light under measurement with a relatively high time resolution can be outputted through a sampling light producing unit 19 in the latter stage. In FIG. 6, although the divider 22 is located before the clock input of the up-converter 21, it is also acceptable that the up-converter 21 is located after the output clock of the frequency shifting circuit shown in FIG. 5.

Moreover, the wavelength (λsam) of the continuous light source 19a constituting the sampling light producing unit 19 is set to be equal to the zero-dispersion wavelength of the optical fiber for generating the intensity correlation signal light. The continuous light source 19a is realizable with a DFB (Distributed FeedBack) laser, a DBR (Distributed Bragg Reflector) laser or the like, but it is not limited to these devices.

FIG. 9 is an illustration of an example of a configuration of the aforesaid optical modulator 19b. The optical modulator 19b shown in FIG. 9 can stably generate a short pulse whose pulse width is on the order of pico-second as described in the document A (Y. Takita, F. Futami, M. Doi, and S. Watanabe, Conference on Laser and Electro Optics, (CLEO 2004), CTuN, May 16-21, San Francisco, Calif., 2004.). This can realize a high time resolution on the sampling.

The optical modulator 19b shown in FIG. 9 includes a phase modulator 28, an intensity modulator 29 and a dispersion medium 30. The phase modulator 28 phase-modulates the CW light from the continuous light source 19a with the sampling frequency signal from the frequency generating unit 18 to apply the frequency chirp. The intensity modulator 29 derives, from the sampling frequency signal from the frequency generating unit 18, only an up-chirp component in which the frequency chirp of an optical signal from the phase modulator 28 monotonically increases or a down-chirp component reverse thereto to pulse it. The dispersion medium 30 is made to perform the dispersion compensation for the frequency chirp applied by the phase modulator 28 for producing a short pulse light having a repetition frequency $f_1$ (=$f_0/N+\Delta f$) (Hz).

That is, the phase modulator 28 functions as a frequency chirp applying unit to apply a frequency chirp to a continuous light on the basis of a sampling frequency, and the intensity modulator 29 functions as an optical pulsing unit to optically pulse the light, to which the frequency chirp is applied in the phase modulator 28, on the basis of the sampling frequency, and the dispersion medium 30 functions as a dispersion compensating unit to carry out the dispersion compensation on the light from the intensity modulator 29 to output it as a sampling light.

With respect to the pulse width of the short pulse light producible in this way, a shorter pulse is producible as the frequency chirping applied by the phase modulator 28 and the frequency increase, and as described in the aforesaid document A, in a case in which the modulation is made with a sine wave signal of 10 GHz, the sampling light pulse whose pulse width is on the order of pico-second is actually produced stably. In this connection, since a broad band spectrum developing due to the chirp stemming from the phase modulation is essential for the production of a short pulse, it is preferable that the phase modulation by the phase modulator 28 is made with a relatively high frequency before the division. In this case, in the intensity modulator 29, if the modulation is made with a sampling signal with a repetition frequency $f_1$ (Hz), a sampling light pulse with the repetition frequency $f_1$ (Hz) is producible.

Moreover, if the spectrum intensity is adjusted through the use of an optical band-pass filter, a high-quality short pulse with no pedestals after the dispersion compensation is producible. For example, the phase modulator 28 and the intensity modulator 29 are realizable with an LN modulator or an InP modulator. Moreover, as the dispersion medium 30, a standard single mode optical fiber, a dispersion compensation fiber or the like is available. Still moreover, as the dispersion medium 30, a fiber Bragg grating, a photonic crystal fiber or the like is also available. A standard single mode optical fiber showing a low insertion loss can suppress the signal light quality degradation at the dispersion compensation, which realizes a high-quality sampling light pulse. In the case of the employment of a dispersion compensation fiber, since the dispersion compensation fiber provides a large dispersion value per unit length and a low insertion loss, it is possible to shorten the required length of the dispersion medium, which realizes the sampling light pulse more stably. Yet moreover, in the case of the employment of a fiber Bragg grating or a photonic crystal fiber, the dispersion value per unit length is further increased than the aforesaid dispersion compensation fiber and, hence, the further shortening of the dispersion medium becomes feasible. Add to it that the size reduction of the dispersion medium can remove the unstability factors originating from the fluctuation of the fiber length, which can lead to the enhancement of the stability of the entire sampling system.

Furthermore, as the other configuration examples of the optical modulator 19b, in addition to the configuration shown in FIG. 9, an electro absorption modulator (EAM) or a lithium niobate Mach-Zehnder optical modulator (LNM) is also employable. The employment of a low-voltage drive LNM whose half-wave voltage is below 1V can realize a sampling light pulse source featuring a low power consumption. In the case of $f_0$=40 GHz, since a sampling light pulse whose full width at half maximum is approximately 10 pico seconds is producible, the time resolution of approximately 10 pico seconds becomes achievable. On the other hand, in the case of EAM, although the pulses produced by a DC bias and an amplitude of a sampling signal differ from each other, in comparison with the employment of the LNM, a sampling light pulse with a narrower pulse width is realizable, which enables the sampling at a higher time resolution. In the case of $f_0$=40 GHz, a sampling light pulse of approximately 5 pico seconds is achievable. Moreover, the integrated construction of a DFB laser and an EAM can produce a stable and compact sampling light pulse.

Still furthermore, for the production of a short pulse light with a shorter pulse width to further enhance the time resolution, it is also appropriate that a pulse compressor is provided on the output side of the optical modulator 19*b* thus constructed. The configuration examples of this pulse compressor are disclosed, for example, in Japanese Patent Laid-Open Nos. 2003-14548 and 2002-77052.

Incidentally, as the optical modulator 19*b*, configurations other than the configurations mentioned above are also applicable. As a configuration for producing a sampling light pulse of $f_1 = f_0/N + \Delta f$ for N=2 or more, in addition to the above-mentioned configurations, it is also appropriate that a first optical modulator modulates a continuous light with a repetition frequency $f_0$ (Hz) to produce a sampling light pulse with the repetition frequency $f_0$(Hz) and a second optical modulator then divides the frequency down to realize a sampling light pulse having a desired frequency. In this case, although two optical modulators are necessary, the requirements for electronic circuits are relaxed for the generation of a light pulse having a low repetition frequency and a short pulse width.

Moreover, the optical section of the optical waveform measuring apparatus 11 according to the second embodiment can use optical pigtail parts for all the input and output, and it is possible to obtain a stable intensity correlation signal light and make a stable waveform observation without using parts spatially coupled to each other on an optical surface plate and vulnerable to external vibrations, environmental variations and others.

[B-2] About Setting Operation by Monitor Control Unit 16

In the optical waveform measuring apparatus 11 according to the second embodiment thus configured, the measurement of a light waveform can be made irrespective of the polarization state of light inputted. Prior to this light waveform measurement, as shown in the flow charts of FIGS. 10 and 11, the linear polarization states of a light under measurement and a sampling light pulse to be inputted to the optical fiber 14*b* forming a nonlinear medium are setting-controlled by controlling the first and second polarization control units 12-1 and 12-2 of the monitor control unit 16, and the direction of the linear polarization to be extracted in the polarizer 14*c* is set by controlling the driver 17*a*.

Figure 10:
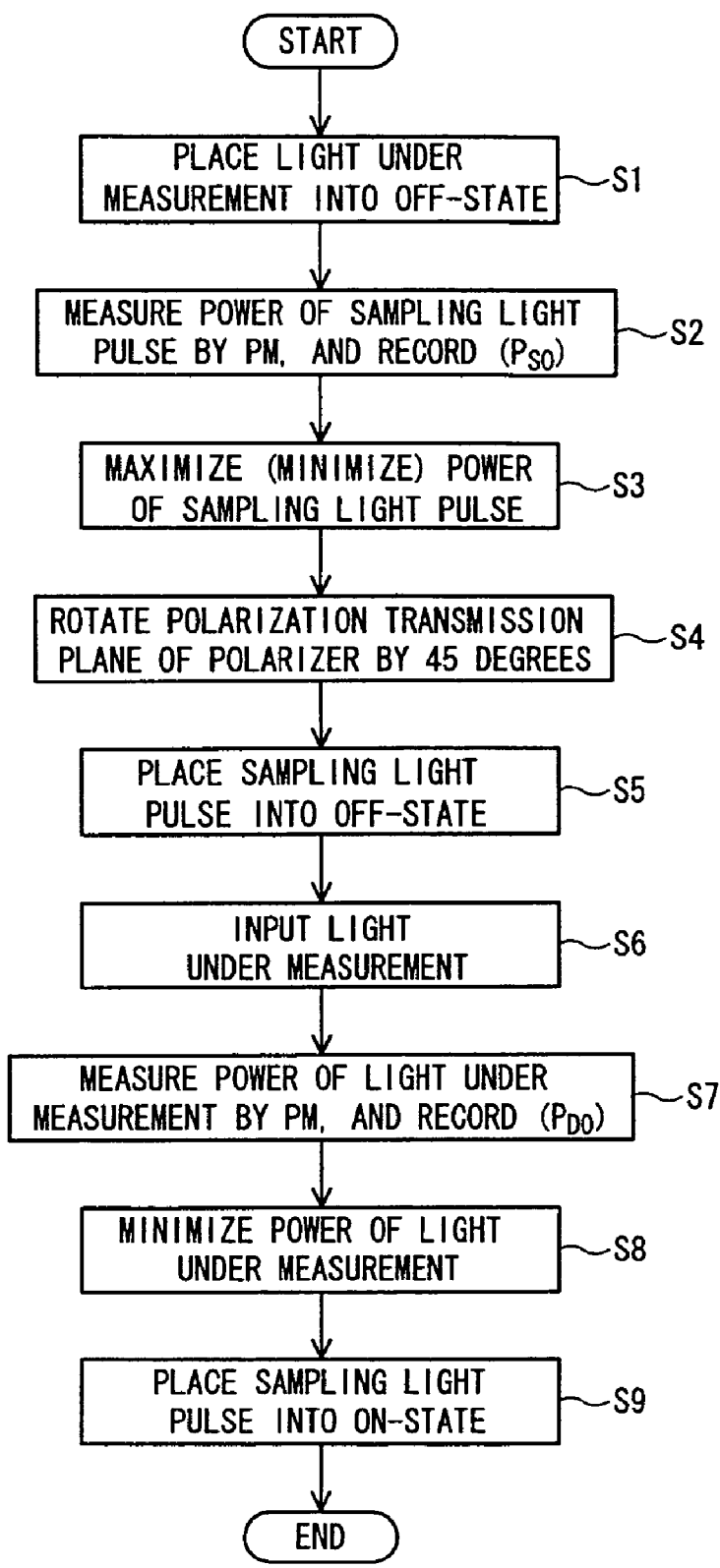
FIGS. 10 to 12 are flow charts useful for explaining an operation according to the second embodiment of the present invention.

That is, in the flow chart of FIG. 10, in a state where the light under measurement is placed into an off-state (step S1), the power meter (PM) 16*a* measures the power of a sampling light pulse outputted from the sampling result outputting unit 14 and the measurement result is stored as $P_{SO}$ in a storage area (not shown) of the comparison controller 16*b* (step S2), and the setting control on the second polarization control unit 12-2 is implemented on the basis of measurement result $P_{SO}$ so that the power level of the sampling light pulse reaches a maximum (step S3).

Even in the optical fiber 14*b* forming the nonlinear medium, at the stage of no inputting of the light under measurement, there is no need for the sampling light pulse to consider the influence of the nonlinear effect. Accordingly, in the aforesaid step S3, the control on the second polarization control unit 12-2 is implemented so that the power level of the sampling light pulse becomes at a maximum, thereby placing the sampling light pulse inputted to the optical fiber 14*b* into a linear polarization state having the direction of a linear polarization that the polarizer 14*c* permits the transmission.

After the sampling light pulse is setting-controlled to the linear polarization state as mentioned above, the comparison controller 16*b* of the monitor control unit 16 controls the driver 17*a* to incline the direction of the linear polarization, the polarizer 14*c* permits the transmission, by 40 to 50 degrees, preferably, 45 degrees (step S4). That is, since the direction of the linear polarization that the polarizer 14*c* permits the transmission is substantially coincident with the direction of the linear polarization of the sampling light pulse inputted to the optical fiber 14*b* when the direction thereof is inclined by 40 to 50 degrees, preferably 45 degrees, the direction of the linear polarization passing through the polarizer 14*c* is inclined by 40 to 50 degrees, preferably 45 degrees.

Following this, in a state where the sampling light pulse is placed into an off-state (step S5) and the light under measurement is placed into an on-state (step S6), the operation proceeds to the setting of the polarization state of the light under measurement. Also in this case, according to the aforesaid case of the setting of the polarization state of the sampling light pulse, the power meter (PM) 16*a* measures the power of the light under measurement outputted from the sampling result outputting unit 14, and the measurement result is stored as $P_{D0}$ in a storage area (not shown) of the comparison controller 16*b* (step S7).

Furthermore, the first polarization control unit 12-1 is controlled on the basis of the measurement result $P_{D0}$ so that the power level of the light under measurement reaches a maximum (step S8). In other words, the first polarization control unit 12-1 is setting-controlled so that the polarization state of the light under measurement becomes the linear polarization having the direction perpendicular to the direction of the linear polarization passing through the polarizer 14*c*, set in the step S4.

When the setting control on the first polarization control unit 12-1 for controlling the polarization state of the light under measurement is implemented in this way, for the waveform measurement of the inputted light under measurement, the polarization state is controlled in the stage that the light under measurement and the sampling light pulse are inputted to the optical fiber 14*b*. Moreover, this leads to the control on the direction of the linear polarization passing through the polarizer 14*c*.

Thereafter, when the sampling light pulse, together with the light under measurement, is outputted from the sampling light outputting unit 13 (step S9), since the sampling result outputting unit 14 can output an intensity correlation signal light, the indicator 15 can carry out the optimum waveform measurement.

At this time, with respect to the light under measurement before inputted to the first polarization control unit 12-1, the conversion can be made into a linear polarization state suitable for the waveform measurement in the first polarization control unit 12-1 irrespective of the polarization state thereof.

Figure 11:
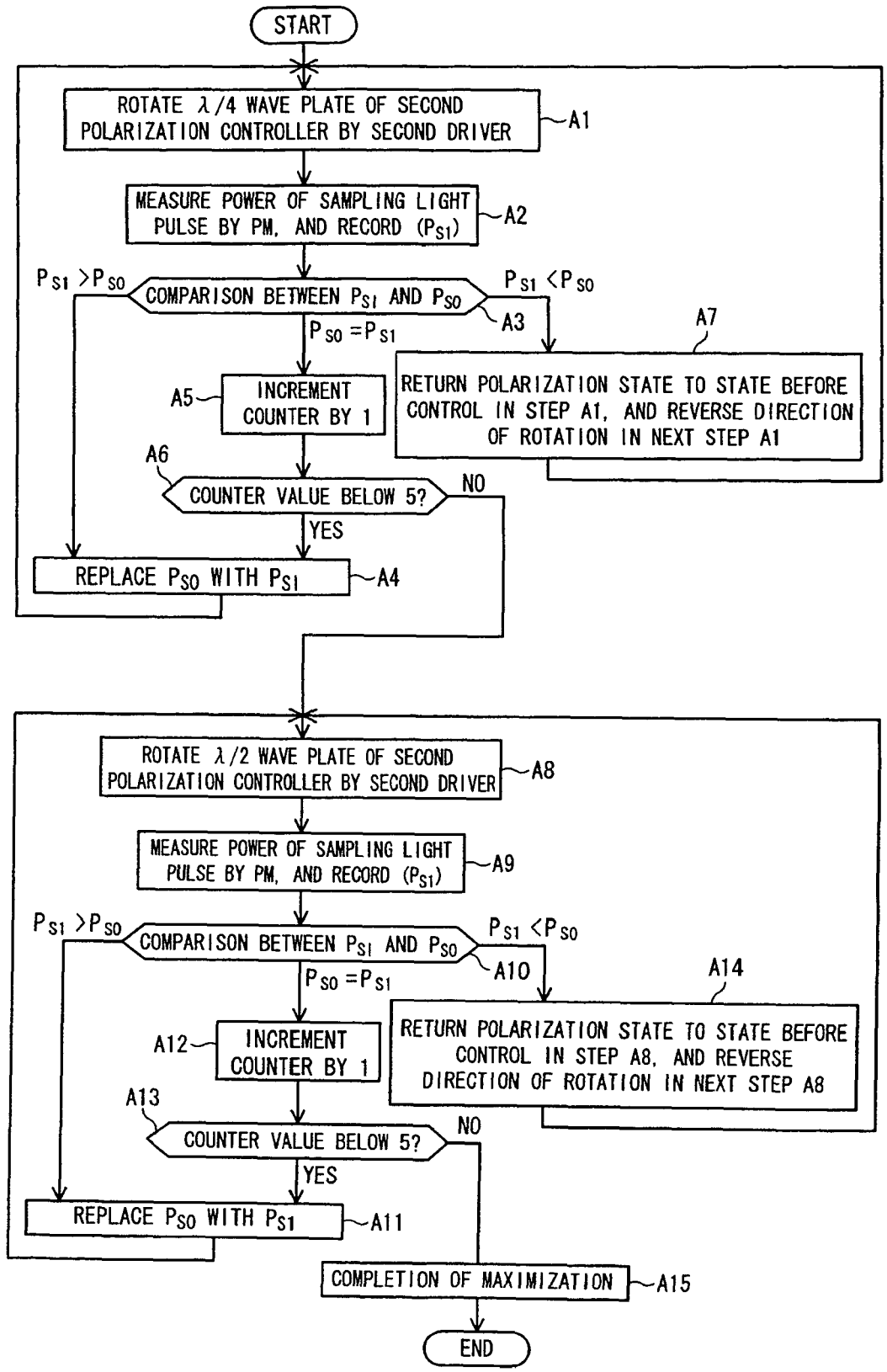

FIG. 11 is a flow chart useful for explaining the processing for the maximization of the sampling light pulse in the step S3 in FIG. 10. For maximizing the level of the sampling light pulse to be measured in the power meter 16*a*, the crystal axis angles of the quarter-wave plate 12*ca* and the half-wave plate 12*cb* of the polarization controller 12*c* constituting the second polarization control unit 12-2 are successively set so that the power level to be measured in the power meter 16*a* reaches a maximum.

First, the second driver 12*d* constituting the second polarization control unit 12-2 is controlled through the comparison controller 16*b* to rotate the crystal axis of the quarter-wave plate 12*ca* of the polarization controller 12 by a unit rotation quantity (step A1) and, at this time, the power monitor 16*a* measures the power level of the sampling light pulse and stores the measurement result as $P_{S1}$ as well as the aforesaid $P_{S0}$ (step A2). Incidentally, this unit rotation quantity is set at a rotation value so that at least a level variation occurs in a measurement range due to the rotation.

Moreover, the comparison controller 16b makes a comparison between the measurement value $P_{S0}$ by the power meter 16a before the rotation of the quarter-wave plate 12ca and the measurement value $P_{S1}$ by the power meter after the rotation and, if $P_{S1}>P_{S0}$, replaces $P_{S1}$ with $P_{S0}$ (step A4 through $P_{S1}>P_{S0}$ route of step A3) and further rotates the quarter-wave plate 12ca by a unit control quantity in the same direction as that of the previous case (step A1 from step A4). On the other hand, if the comparison result shows $P_{S1}<P_{S0}$, the rotation quantity is returned to the value immediately before. Moreover, the quarter-wave plate 12ca is rotated (step A1) by a unit control quantity in a direction opposite to the previous rotating direction (step A7 through $P_{S1}<P_{S0}$ route of step A3), and the comparison is further made between $P_{S0}<P_{S0}$ (steps A2 and A3).

At this time, the comparison controller 16b counts the number of times of $P_{S0}=P_{S1}$ (step A5 through $P_{S0}=P_{S1}$ route of step A3). Following this, the aforesaid unit control quantity rotation and comparison between $P_{S0}$ and $P_{S1}$ are repeatedly carried out until the count value reaches "5" (step A4 through YES route of step A6).

Moreover, the rotation angle of the quarter-wave plate 12ca at the time that the count value reaches "5" is set as a rotation angle for placing (converting) the sampling light pulse into the aforesaid linear polarization, and the rotation angle of the half-wave plate 12cb is then determined as in the case of the quarter-wave plate 12ca (steps A8 to A14 through NO route of step A6). The steps A8 to A14 correspond to the steps A1 to A7, respectively.

When the sampling light pulse passes through the quarter-wave plate 12ca and the half-wave plate 12cb the rotation angles of which are determined in this way, in the stage where the sampling light pulse is inputted to the optical fiber 14b, it is possible to obtain a linear polarization state having a direction which is substantially the same as the direction of the linear polarization that the polarizer 14c permits the transmission (step A15). Incidentally, the count value "5" in the aforementioned steps A6 and A13 is set as one example, and it is also acceptable that a value other than this value is set as a reference for determining the rotation angle.

With respect to the sampling light pulse in the aforesaid step S3, although the processing is conducted so as to maximize the power of the sampling light pulse, that is, the processing is conducted to make a linear polarization state having a direction substantially equal to the direction of the linear polarization passing through the polarizer 14c, according to the present invention, it is also appropriate that the setting control on the second polarization control unit 12-2 is carried out so as to minimize the power of the sampling light pulse. This requires the processing for making a linear polarization state having a direction substantially perpendicular to the direction of the linear polarization that the polarizer 14c permits the transmission. However, when the inclination operation for the polarizer 14c and the setting of the polarization state of the light under measurement are conducted in like manner, the relationship in polarization state mentioned above is attainable.

Figure 12:
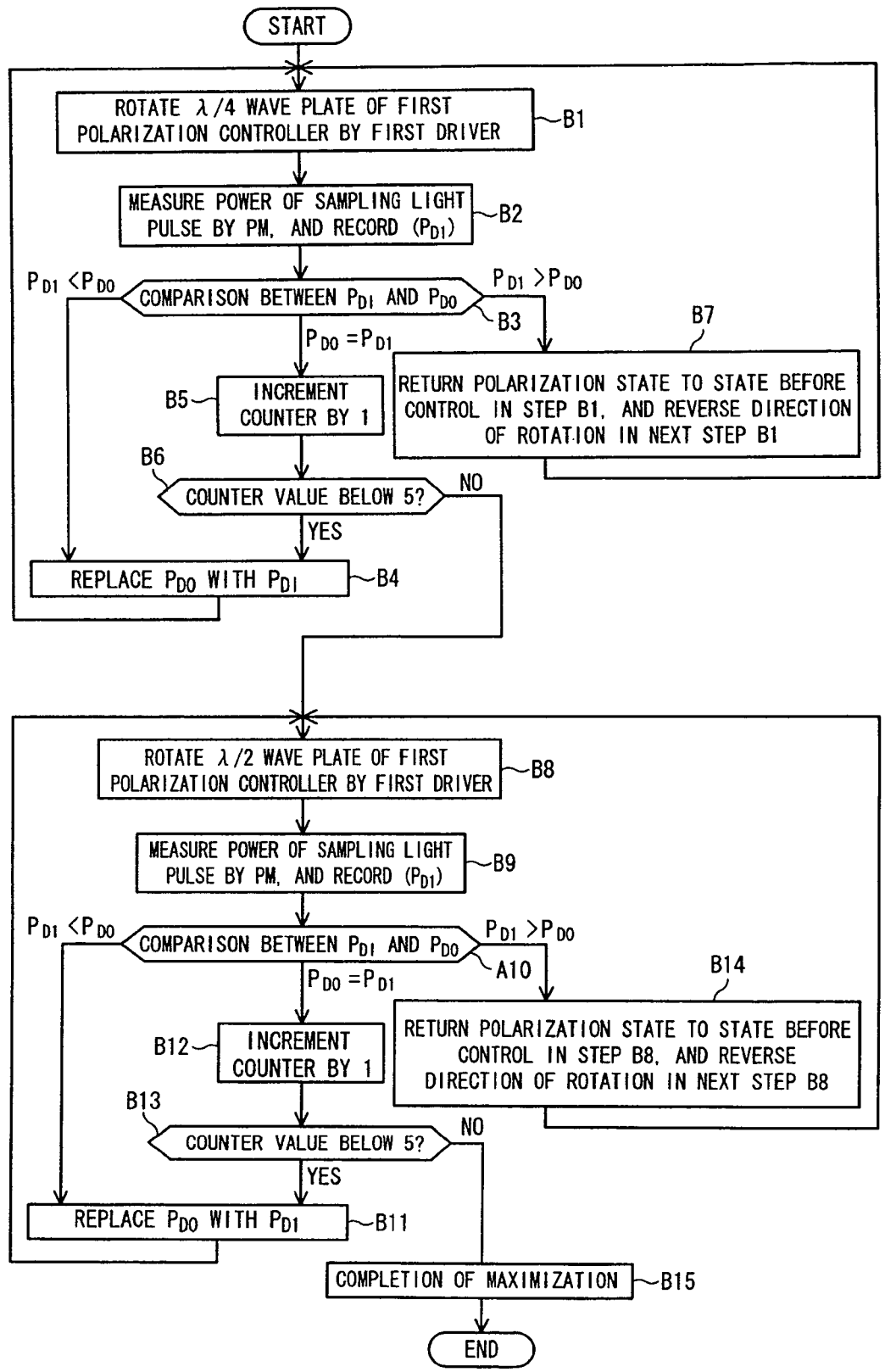

FIG. 12 is a flow chart useful for explaining the minimization processing on the light under measurement in the aforesaid step S8 in FIG. 10. For minimizing the level of the light under measurement to be measured by the power meter 16a, the crystal axis angles of the quarter-wave plate 12aa and the half-wave plate 12ab of the polarization controller constituting the first polarization control unit 12-1 are successively set so that the power level to be measured by the power meter 16a reaches a minimum.

First, the first driver 12b constituting the first polarization control unit 12-1 is controlled through the comparison controller 16b to rotate the crystal axis of the quarter-wave plate 12aa of the polarization controller 12a by a unit rotation quantity (step B1), and the power level of the light under measurement at this time is measured by the power monitor 16a to be recorded as $P_{D1}$ as in the case of the aforesaid $P_{D0}$ (step B2). Incidentally, this unit rotation quantity is set at a rotation value so that at least a level variation occurs in a measurement range due to the rotation.

Moreover, the comparison controller 16b makes a comparison between the measurement value $P_{D0}$ by the power meter 16a before the rotation of the quarter-wave plate 12aa and the measurement value $P_{D1}$ by the power meter 16a after the rotation. If $P_{D1}$ is smaller than $P_{D0}$, $P_{D1}$ is replaced with the value of $P_{D0}$ (step B4 through the $P_{D1}<P_{D0}$ route of step B3), and the quarter-wave plate 12aa is rotated by the unit control quantity in the same direction as that of the previous case (from step B4 to step B1). On the other hand, if $P_{D0}<P_{D1}$, it is returned by the rotation quantity immediately before. Still moreover, the quarter-wave plate 12aa is rotated (step B1) by the unit control quantity in the direction opposite to the previous rotation direction (step B7 through the $P_{D1}<P_{D0}$ route of step B3), and a comparison is made between $P_{D1}<P_{D0}$ to further conduct the rotation by the unit control quantity (steps B2 and B3).

At this time, the comparison controller 16b counts the number of times of $P_{D0}=P_{D1}$ (step B5 through the $P_{D1}=P_{D0}$ route of step B3). Following this, the aforesaid unit control quantity rotation and comparison between $P_{D0}$ and $P_{D1}$ are repeatedly carried out until the count value reaches "5" (step B4 through YES route of step B6).

Moreover, the rotation angle of the quarter-wave plate 12aa at the time that the count value reaches "5" is set as a rotation angle for placing the light under measurement into the aforesaid linear polarization, and the rotation angle of the half-wave plate 12ab is then determined as in the case of the quarter-wave plate 12aa (steps B8 to B14 through NO route of step B6). The steps B8 to B14 correspond to the steps B1 to B7, respectively.

When the light under measurement passes through the quarter-wave plate 12aa and the half-wave plate 12ab the rotation angles of which are determined in this way, in the stage where the light under measurement is inputted to the optical fiber 14b, it is possible to obtain a linear polarization state having a direction substantially perpendicular to the direction of the linear polarization that the polarizer 14c permits the transmission (step B15). Incidentally, the count value "5" in the aforementioned steps B6 and B13 is set as one example, and it is also acceptable that a value other than this value is set as a reference for determining the rotation angle.

[B-3] Effects

In the optical waveform measuring apparatus 11 according to the second embodiment thus configured, the sampling light pulse outputted from the sampling light outputting unit 13 passes through the wave plates 12ca and 12cb of the second polarization controller 12c, which are set in rotation angle, to undergo the conversion into a linear polarization state, with the direction of the linear polarization being set to make an angle of 40 to 45 degrees, preferably 45 degrees, with respect to the direction of the linear polarization the polarizer 14c permits the transmission.

In addition, the light under measurement passes through the wave plates 12aa and 12ab of the first polarization controller 12a set in rotation angle and is converted into a linear polarization state, with the direction of the linear polarization being set to have an angle to become substantially perpendicular to the direction of the linear polarization passing through the polarizer 14c.

The light under measurement and the sampling light pulse, which have passed through the first and second polarization controllers 12a and 12c, are inputted to the optical fiber 14b forming a nonlinear medium, since only the intensity correlation signal light is subjected to the rotation with respect to the polarization state of the light under measurement, the polarizer 14c located at the output end of the optical fiber 14b can make a separation between the light under measurement and the intensity correlation signal light.

Still additionally, the wavelength filter 15a, which is made to remove the sampling light pulse, derives only the intensity correlation signal light and outputs it to the photoelectric converter 15b for outputting it to the A/D converter 15c in the form of an electric intensity correlation signal. The A/D converter 15c converts the amplitude of the electric signal from the photoelectric converter 15b into a digital signal through the use of a sampling frequency signal $f_1$ outputted from the trigger circuit 18c constituting the frequency generating unit 18, and the waveform indicator 15d receives the digital signal from the A/D converter 15c as vertical axis input and receives a sweep signal $\Delta f$ from the oscillator 18b as horizontal axis input, thereby displaying the waveform of the light under measurement on a screen.

Although the measurement of the waveform becomes feasible through the display of the waveform of the light under measurement, it is also appropriate that, when needed, the polarization controllers 12a, 12c and the polarizer 14c are controlled as described above in [B-2]. In this case, for coping with the variation of the polarization state of the light under measurement, it is also appropriate that the rotation angle of the polarizer 14c and the linear polarization state of the sampling light pulse to be set in the polarization controller 12c are placed into a fixed condition while only the rotation angles of the wave plates 12aa and 12ab of the polarization controller 12a are controlled.

As described above, according to the second embodiment of the present invention, the polarization state control unit 17 can control the polarization state of the light under measurement to be inputted to the sampling result outputting unit 14 so that the waveform measurement can be made on the basis of the light outputted from the sampling result outputting unit 14, which provides an advantage that the generation of an intensity correlation signal light does not depend upon the polarization state of the light under measurement while still using the single nonlinear medium 14b without employing a complicated polarization diversity configuration.

In addition, there is an advantage that the generation of the intensity correlation signal light has no dependency on the polarization state of the light under measurement through relatively simple control, i.e., through the feedback control on the polarization state of the light under measurement and the feedback control on the polarization of the sampling light pulse.

Still additionally, it is possible to faithfully observe the waveform of the light under measurement in an arbitrary polarization state with a high time resolution which is not realizable by an oscilloscope based on electric sampling and to observe a very-high-bit-rate signal light easily and stably, thereby accelerating a communication system using a very-high-bit-rate signal light and the research and development of the optical signal processing technology. Yet additionally, it is also applicable to a monitoring apparatus such as a signal quality monitor, so it is expectable to put an easy optical signal monitor into practical use.

[B-4] Description of Modification of Second Embodiment

Figure 13:
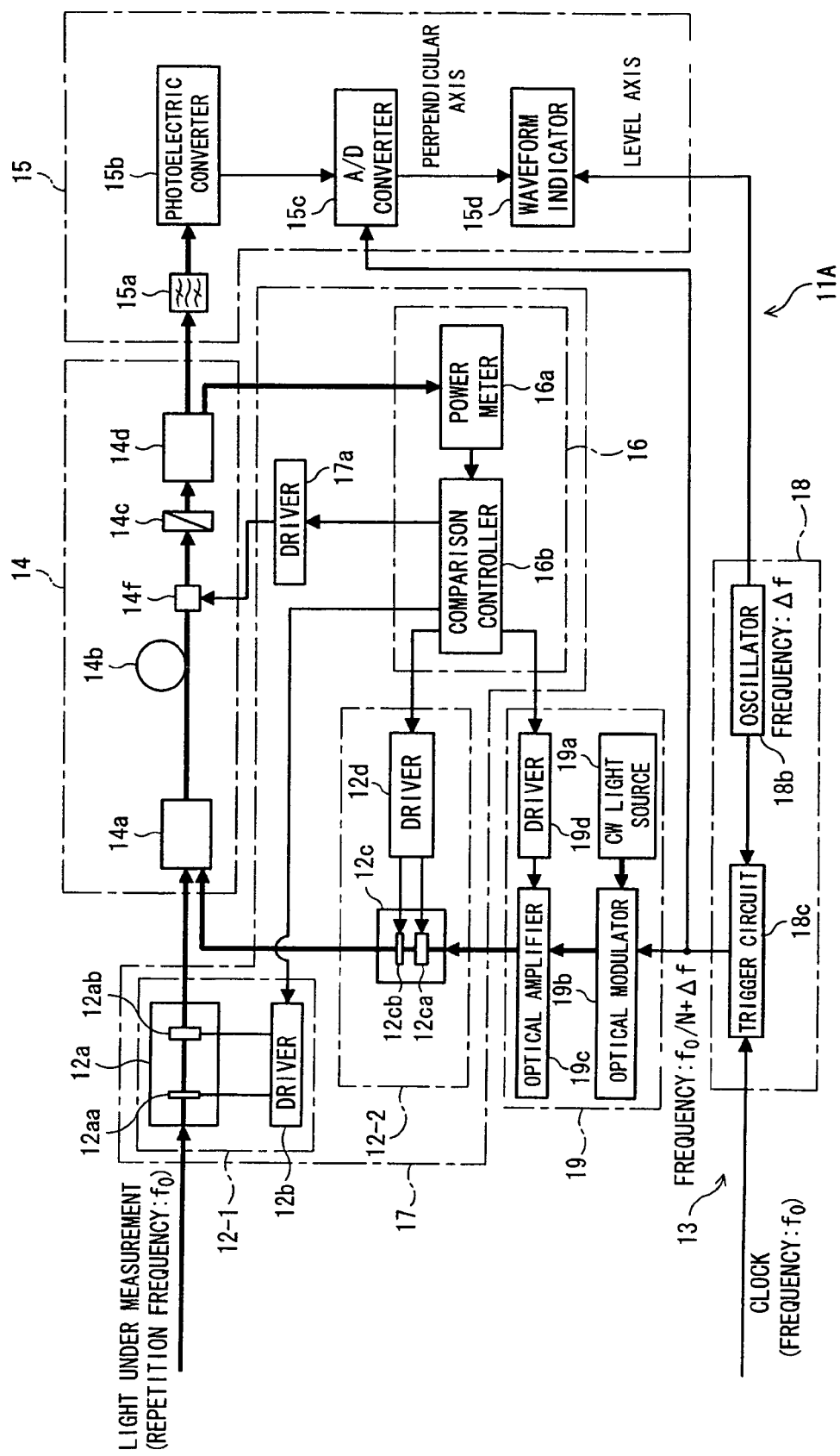
FIGS. 13 and 14 are block diagrams showing a modification of the second embodiment of the present invention.

Although in the above-described second embodiment the linear polarization component extracting unit forming the sampling result outputting unit 14 is configured using the polarizer 14c and the directional coupler 14d, the present invention is not limited to this, but it is also appropriate that, for example, as in an optical waveform measuring apparatus 11A shown in FIG. 13, instead of a polarization transmission plane of the polarizer being rotated by 40 to 50 degrees, preferably 45 degrees, a Faraday rotator 14f is provided in the former stage of a polarizer to apply a magnetic field, thereby rotating the polarization axis of the linear polarization to be taken out by 40 to 50 degrees, preferably 45 degrees. In this case, the aforesaid Faraday rotator 14f, polarizer 14c and directional coupler 14d constitute a linear polarization component extracting unit.

Moreover, it is also appropriate that, for example, as in a polarization beam splitter (PBS) 14e is provided in place of the polarizer 14c and the directional coupler 14d organizing the aforesaid linear polarization component extracting unit. The polarization beam splitter 14e shown in FIG. 14 comprises one input port and two output ports and is located at an output end of the optical fiber 14b to output the TE polarization component of the incident light and the TM polarization component thereof to different output ports. For example, the TM polarization component is outputted to the wavelength filter 15a of the indicator 15, while the TE polarization component is outputted to the power meter 16a of the monitor control unit 16.

In this case, the port for outputting the TM polarization component from the PBS 14e can output a linear polarization component substantially equivalent to the output of the polarizer 14c in the case of the above-described second embodiment, and the port for outputting the TE polarization component from the PBS 14e can output a linear polarization component perpendicular to the aforesaid TM polarization component. That is, prior to the waveform measurement, the monitor control unit 16 can setting-control the first and second polarization control units 12-1 and 12-2 on the basis of the light from the TE polarization output port of the PBS 14e.

Concretely, as in the case of the step S3 mentioned above with reference to FIG. 10, the crystal axis angles of the wave plates 12ca and 12cb of the second polarization control unit 12-2 are rotated and set so that the power of the sampling light pulse outputted from the TE polarization output port of the PBS 14e reaches a maximum (or a minimum), thereby setting the polarization state of the sampling light pulse at the stage of the input to the optical fiber 14b. Moreover, as in the case of the step S8 of FIG. 10, the wave plates 12aa and 12ab of the first polarization control unit 12-1 is rotated and set so that the power of the light under measurement to be outputted from the TE polarization output port of the BPS 14e becomes at a maximum, thereby setting the polarization state of the light under measurement at the stage of the input to the optical fiber 14b.

Figure 14:
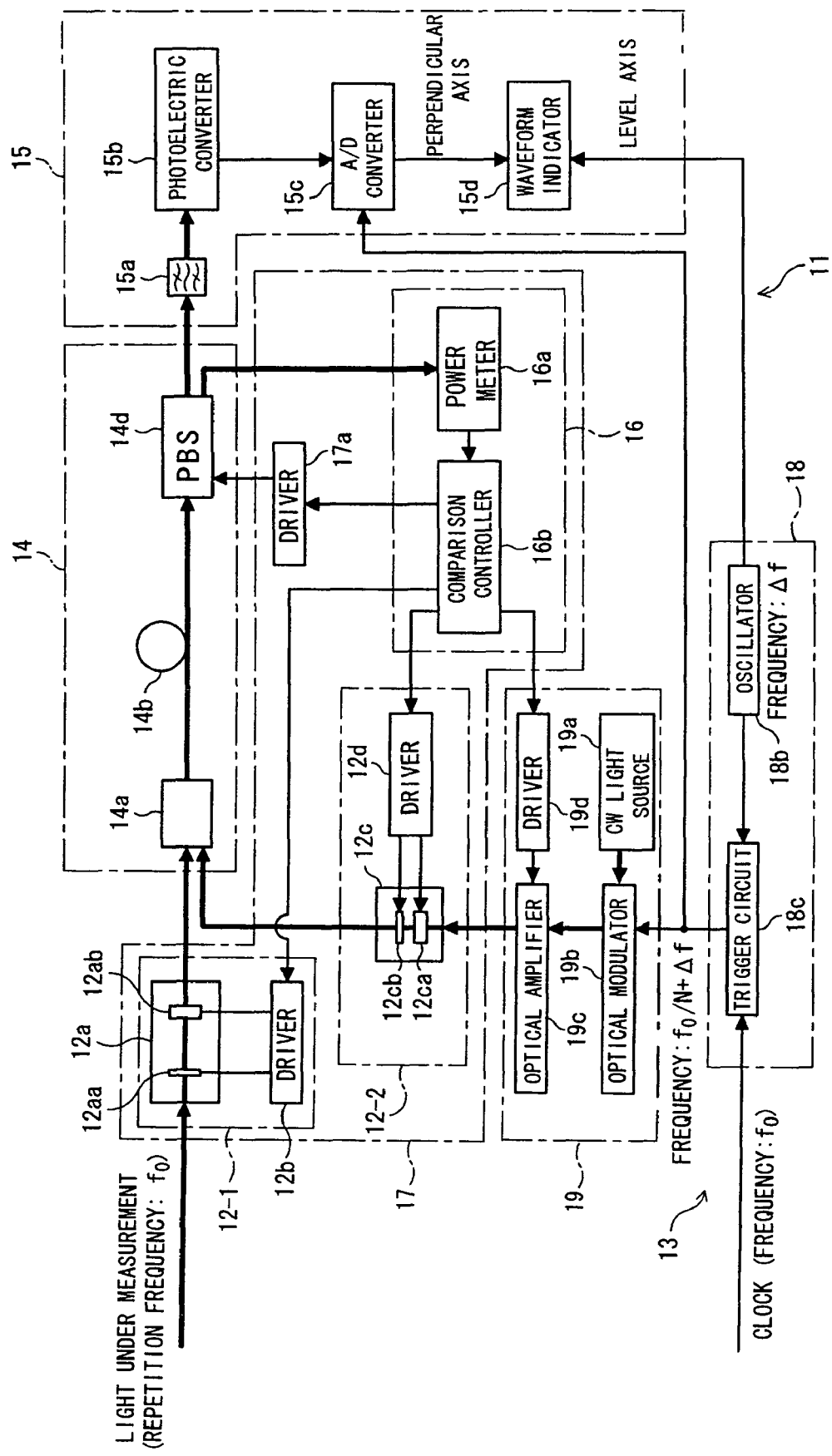

Although in the above-described second embodiment two parts of the directional coupler 14d and the polarizer 14c are required for the linear polarization component extracting unit, in the optical waveform measuring apparatus 11B shown in FIG. 14, the one PBS 14e can fulfill the same role, which leads to a simplified configuration.

[C] Description of Third Embodiment

Figure 15:
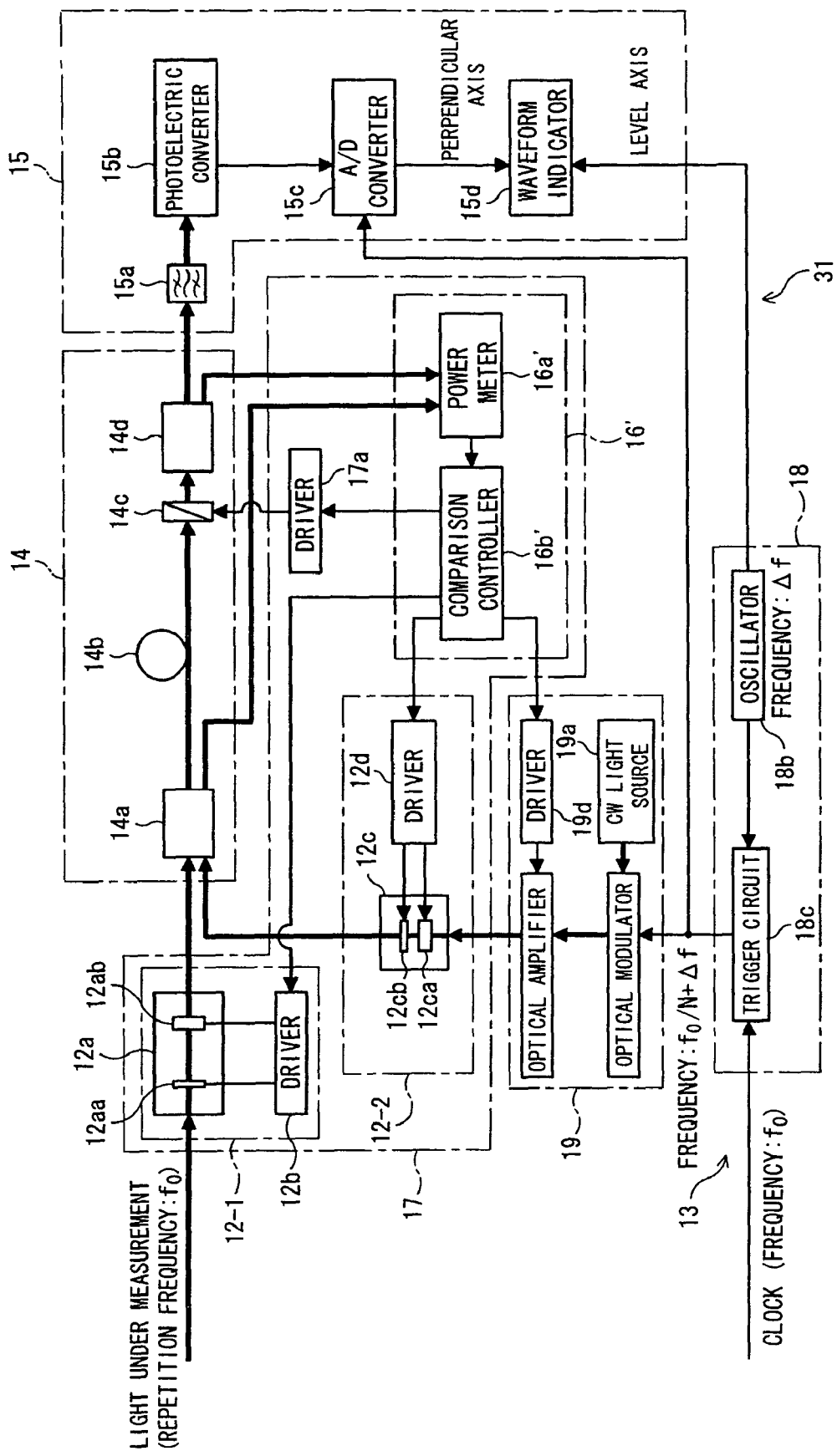
FIG. 15 is a block diagram showing an optical waveform measuring apparatus according to a third embodiment of the present invention.

FIG. 15 is an illustration of an optical waveform measuring apparatus 31 according to a third embodiment of the present invention. The optical waveform measuring apparatus 31 shown in FIG. 15 differs from the above-described second embodiment in the mode of setting control on the first and second polarization control units 12-1 and 12-2 by a monitor control unit 16' prior to the waveform measurement, and other configuration is basically the same and, in FIG. 15, the same reference numerals as those in FIG. 3 basically designate the same parts.

The monitor control unit 16' of the optical waveform measuring apparatus according to the third embodiment is composed of a power meter 16a' and a comparison controller 16b' which are different in function from those (reference numerals 16a and 16b) in the second embodiment, and the setting control on the aforesaid first and second polarization control units 12-1 and 12-2 is facilitated in comparison with that of the above-described second embodiment.

That is, in the optical waveform measuring apparatus 31 shown in FIG. 15, the output of the directional coupler 14a is divided into two, with one being connected to the optical fiber 14b and the other being connected to the power meter 16a' of the monitor control unit 16'. The power meter 16a' can measure the power of a portion of the sampling light pulse or the light under measurement to be inputted to the optical fiber 14b.

Moreover, the comparison controller 16b' sets a threshold on the basis of the power of the light to be inputted to the aforesaid optical fiber 14b and makes a comparison between the power of the light outputted from the polarizer 14c and the set threshold to make a decision on the basis of the comparison result as to whether the output power reaches a minimum.

Figure 16:
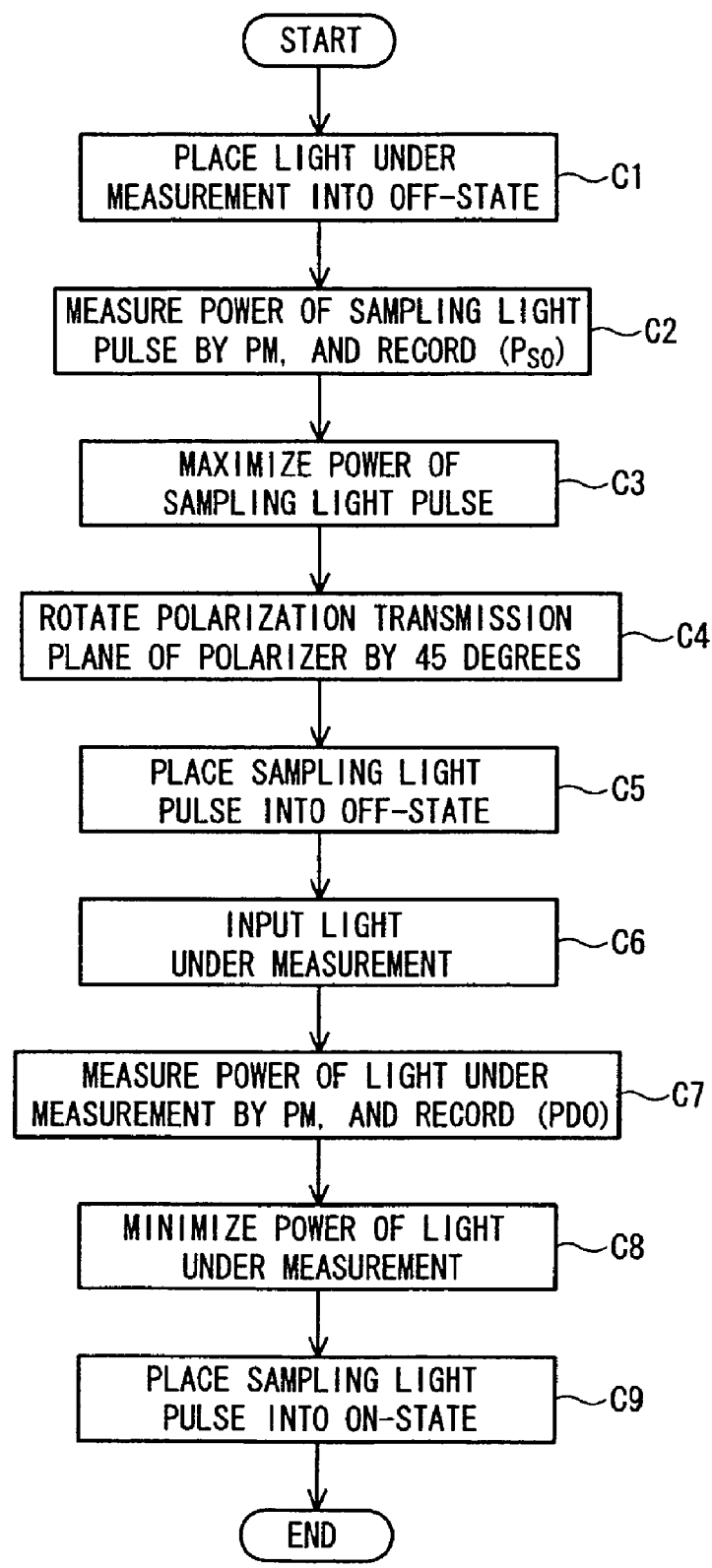
FIGS. 16 and 17 are flow charts useful for explaining an operation according to the third embodiment of the present invention.
Figure 17:
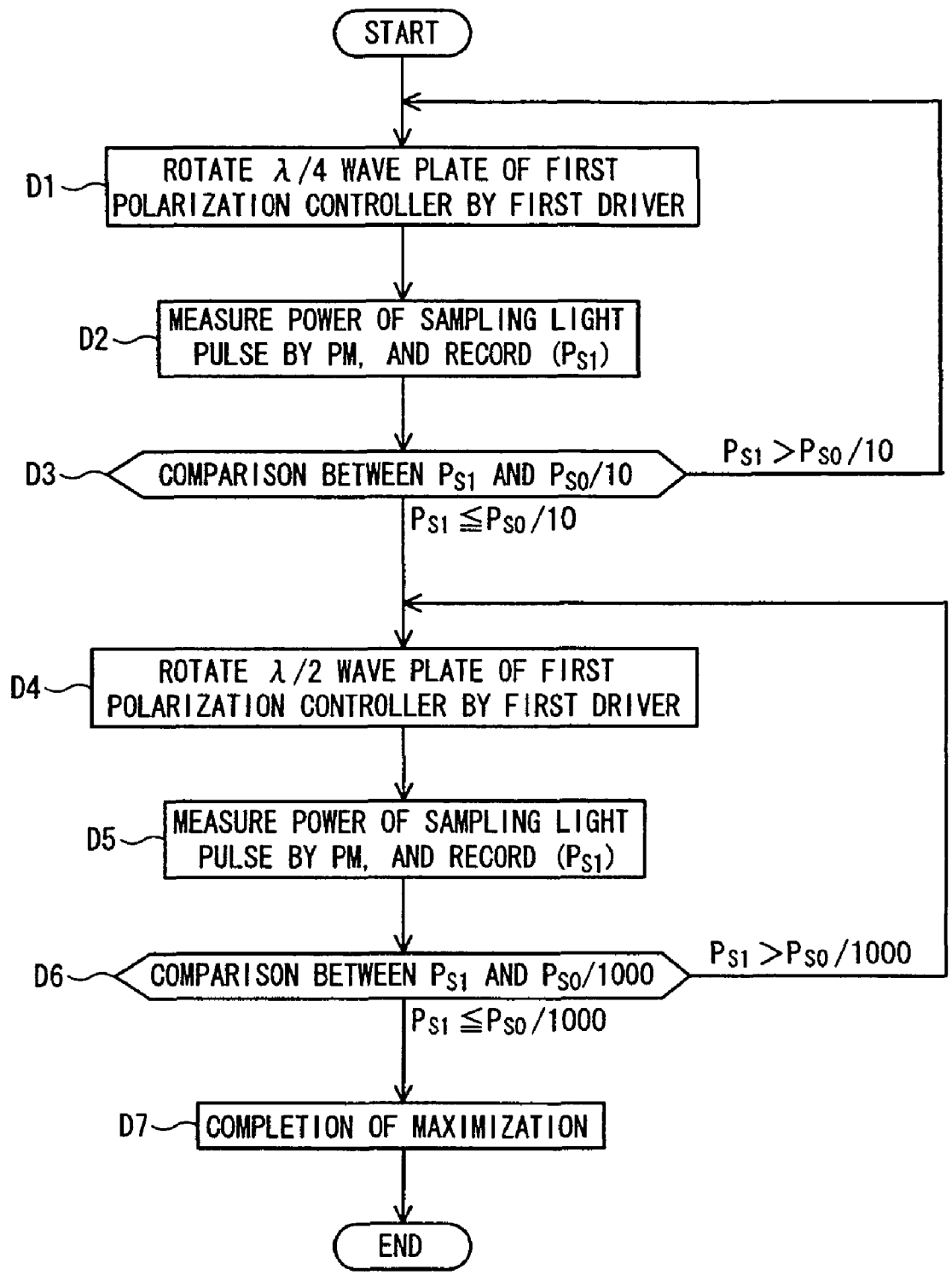

Also in the optical waveform measuring apparatus 31 thus configured, prior to the measurement of the waveform of the light under measurement, as shown in the flow charts of FIGS. 16 and 17, the setting control on the first and second polarization control units 12-1 and 12-2 is implemented by the monitor control unit 16'.

That is, in the flow chart of FIG. 16, in a state where the light under measurement is placed into an off-state (step C1), the power meter (PM) 16a' measures the power of the sampling light pulse outputted from the directional coupler 14a of the sampling result outputting unit 14, i.e., the optical power of the sampling light pulse at the former stage of the input to the optical fiber 14b, with the measurement result being recorded as $P_{S0}$ in a storage area (not shown) of the comparison controller 16b' (step C2). Subsequently, the second polarization control unit 12-2 is setting-controlled on the basis of the measurement result $P_{S0}$ so that the power level of the sampling light pulse becomes at a minimum (step C3).

After the sampling light pulse is setting-controlled to be a linear polarization state, the comparison controller 16b' of the monitor control unit 16 controls the driver 17a so that the direction of the linear polarization that the polarizer 14c permits the transmission is inclined by 40 to 50 degrees, preferably by 45 degrees (step C4). That is, since the direction of the linear polarization passing through the polarizer 14c is substantially perpendicular to the direction of the linear polarization of the sampling light pulse to be inputted to the optical fiber 14b, when the polarizer 14c is inclined by 40 to 50 degrees, preferably by 45 degrees, the direction of the linear polarization passing through the polarizer 14c is inclined by 40 to 50 degrees, preferably by 45 degrees.

Following this, the sampling light pulse is placed into an off-state (step C5) and the light under measurement is placed into an on-state (step C6), and the control then advances to an operation for setting the polarization state of the light under measurement. Also in this case, according to the aforesaid case of the setting of the polarization state of the sampling light pulse, the power meter (PM) 16a' measures the power of the light under measurement outputted from the directional coupler 14a of the sampling result outputting unit 14, i.e., the optical power of the light under measurement at the former stage of the input to the optical fiber 14b, with the measurement result being recorded as $P_{D0}$ in a storage area of the comparison controller 16b' (step C7). Next, the first polarization control unit 12-1 is setting-controlled on the basis of the measurement result $P_{D0}$ so that the power level of the sampling light pulse reaches a minimum (step C8).

When the setting control on the first polarization control unit 12-1 for controlling the polarization state of the light under measurement is carried out in this way, for the waveform measurement of the light under measurement inputted, the polarization state is controlled at the stage of the input of the light under measurement and the sampling light pulse to the optical fiber 14b. Moreover, this leads to the setting on the direction of the linear polarization that the polarizer 14c permits the transmission.

Thereafter, when the sampling light pulse, together with the light under measurement, is outputted from the sampling light outputting unit 13 (step C9), the sampling result outputting unit 14 can output the intensity correlation signal light and, hence, the indicator 15 can carry put the optimum waveform measurement.

FIG. 17 is a flow chart useful for explaining the processing for the maximization of the sampling light pulse (or the light under measurement) in the above-mentioned step C3. In the aforesaid step C3, the sampling light pulse is set at the direction of the linear polarization perpendicular to the direction of the linear polarization passing through the polarizer 14c.

Therefore, the monitor control unit 16' controls the rotation angles of the wave plates 12ca and 12cb of the second polarization controller 12c so that the power level of the sampling light pulse to be outputted from the directional coupler 14d becomes a value (for example, 1/1000 of the measurement value $P_{S0}$ of the level of the sampling light pulse at the stage of the input to the optical fiber 14b) set as a threshold.

Concretely, the quarter-wave plate 12ca is rotated by the unit rotation quantity as well as the second embodiment (step D1) and, at this time, the power level of the sampling light pulse outputted from the directional coupler 14d is measured by the power monitor 16a' and is recorded as $P_{S1}$ as well as the above-mentioned $P_{S0}$ (step D2).

Moreover, this $P_{S1}$ is compared with a target value (for example, 1/10 of $P_{S0}$) in the case of the rotation of only the quarter-wave plate 12ca (step D3). If $P_{S1}$ is larger than the aforesaid target value, the quarter-wave plate 12ca is again rotated by the unit rotation quantity (step D1 through the "$P_{S1} > P_{S0}/10$" route of step D3). Subsequently, the quarter-wave plate 12ca is rotated until the measured $P_{S1}$ becomes below the target value $P_{S0}/10$.

Thus, the rotation angle of the quarter-wave plate 12ca at the time that the measured $P_{S1}$ becomes below the target value $P_{S0}/10$ becomes a rotation angle to be set. Following this, the rotation angle of the half-wave plate 12cb is set. For the setting of the half-wave plate 12cb, the target value of the power level of the sampling light pulse outputted from the directional coupler 14d is set at 1/1000 of $P_{S0}$ which is the aforesaid threshold.

That is, the half-wave plate 12cb is rotated by the unit rotation quantity as well as the second embodiment (step D4 through the "$P_{S1} \leq P_{S0}/10$" route of step D3). At this time, the power level of the sampling light pulse outputted from the directional coupler 14*d* is measured by the power monitor 16*a*' and is recorded as $P_{S1}$ as well as the aforesaid $P_{S0}$ (step D5).

In addition, this $P_{S1}$ is compared with the aforesaid threshold (for example, 1/1000 of $P_{S0}$) (step D6). If $P_{S1}$ is larger than the aforesaid target value, the half-wave plate 12*cb* is again rotated by the unit rotation quantity (step D4 through the "$P_{S1} > P_{S0}/1000$" route of step D6). Subsequently, the half-wave plate 12*cb* is rotated until the measured $P_{S1}$ becomes below the threshold $P_{S0}/1000$.

Thus, the rotation angle of the half-wave plate 12*ca* at the time that the measured $P_{S1}$ becomes below the threshold $P_{S0}/1000$ becomes a rotation angle to be set, and the setting control on the second polarization controller 12*c* reaches completion (step D7 through the "$P_{S1} \leq P_{S0}/1000$" route of step D6).

In this connection, the processing for the minimization of the light under measurement in the step C8 in FIG. 16 can also be conducted according to the above-described case shown in FIG. 17. That is, the monitor control unit 16' carries out the rotation control on the quarter-wave plate 12*aa* of the first polarization controller 12*a* in a state where 1/10 of the power level of the light under measurement at the stage of the input to the optical fiber 14*b* is set at a power target value of the light under measurement to be outputted from the directional coupler 14*d*.

Moreover, subsequently to the setting of the rotation angle of the quarter-wave plate 12*aa*, the setting of the rotation angle is done with respect to the half-wave plate 12*ab*. Also in this case, the rotation control on the half-wave plate 12*ab* of the first polarization controller 12*a* is implemented in a state where, for example, 1/1000 of the power level of the light under measurement at the stage of the input to the optical fiber 14*b* is set at the power target value of the light under measurement to be outputted from the directional coupler 14*d*.

Thus, when passing through the wave plates 12*ca* and 12*cb* of the second polarization controller 12*c* set in rotation angle, the sampling light pulse outputted from the sampling light outputting unit 13 is converted into a linear polarization state, and the direction of the linear polarization thereof has an angle of 40 to 50 degrees, preferably 45 degrees, with respect to the direction of the linear polarization that the polarizer 14*c* permits the transmission. Moreover, when passing through the wave plates 12*aa* and 12*ab* of the first polarization controller 12*a* set in rotation angle, the light under measurement is converted into a linear polarization state, and the direction of the linear polarization thereof has an angle to become substantially perpendicular to the direction of the linear polarization the polarizer 14*c* permits the transmission.

When the first and second polarization control units 12-1 and 12-2 are setting-controlled in this way, the waveform measurement can be made with respect to the light under measurement. That is, when the light under measurement and the sampling light pulse passing through the first and second polarization controllers 12*a* and 12*c* are inputted to the optical fiber 14*b* forming a nonlinear medium, the polarization state of the light under measurement rotates with respect to only the intensity correlation signal light component and, hence, the light under measurement and the intensity correlation signal light are separated from each other by means of the polarizer 14*c* located at the output end of the optical fiber 14*b*. The indicator 15 converts the separated intensity correlation signal light into a digital electric signal and performs the waveform display through the waveform indicator 15*d*.

As described above, the third embodiment of the present invention provides the advantages similar to those of the above-described second embodiment and further simplifies the setting control on the first and second polarization control units 12-1, 12-2 by the monitor control unit 16', i.e., the control of the polarization states of the sampling light pulse and the light under measurement.

[D] Description of Fourth Embodiment

[D-1] Configuration

Figure 18:
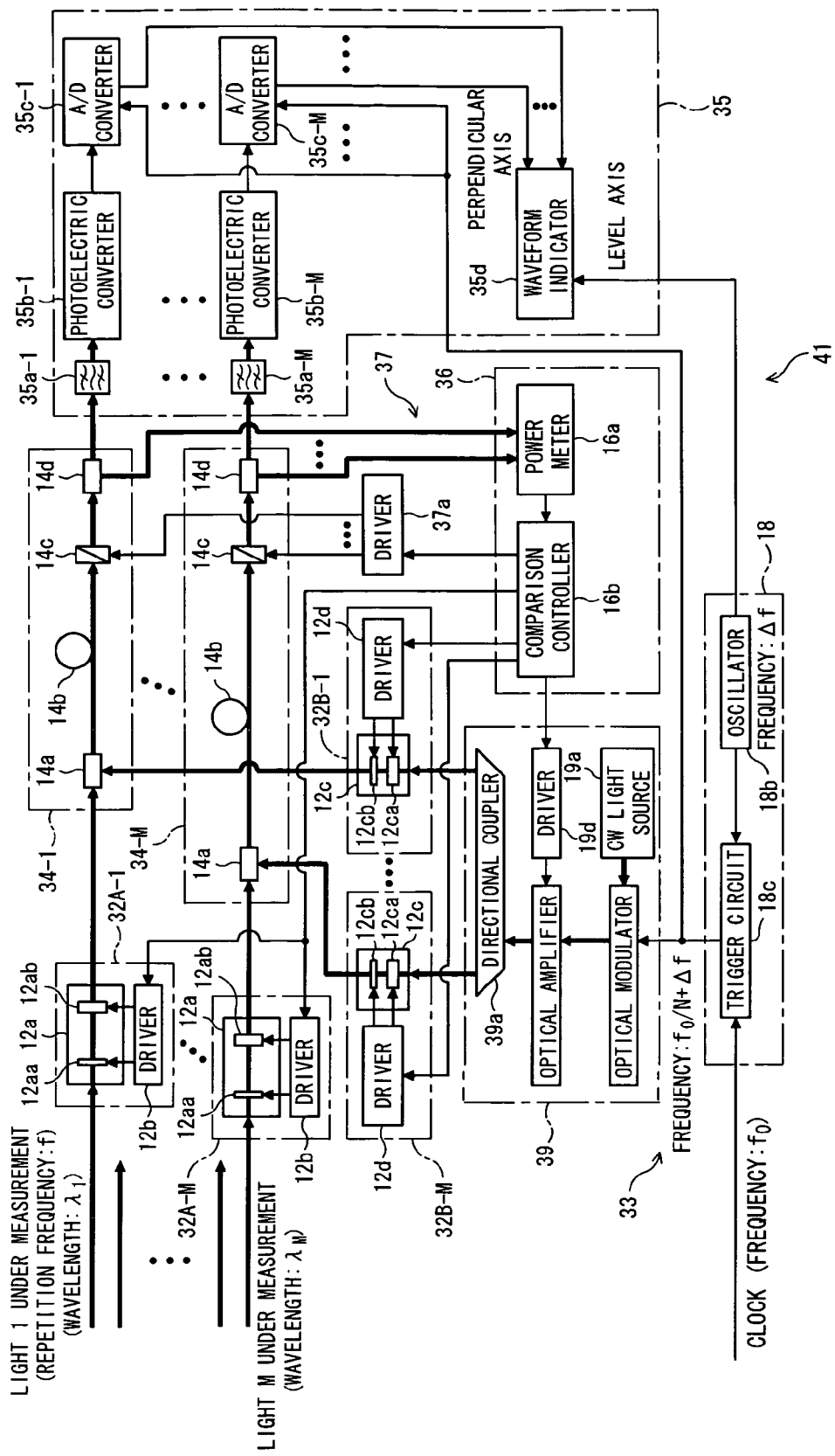
FIG. 18 is a block diagram showing an optical waveform measuring apparatus according to a fourth embodiment of the present invention.

FIG. 18 is a block diagram showing an optical waveform measuring apparatus 41 according to a fourth embodiment of the present invention. The optical waveform measuring apparatus 41 shown in FIG. 18 differs from the apparatus according to the second and third embodiments in that it is designed to measure optical waveforms with M (M denotes an integer equal to or more than 2, and this also applies to the following description) wavelengths $\lambda_1$ to $\lambda_M$, i.e., optical waveforms of a plurality of channels.

That is, the optical waveform measuring apparatus 41 according to the fourth embodiment has the configuration (reference numerals 32A-1 to 32A-M, 32B-1 to 32B-M, 33, 34-1 to 34-M, and 35 to 39) corresponding to that (reference numerals 12-1, 12-2, and 13 to 19) of the second embodiment and, for the measurement of the optical waveforms with the respective wavelengths, has a configuration in which a portion of components are put in a shared condition for the measurement of optical pulses with the respective wavelengths.

Concretely, a frequency generating unit 18, a sampling light producing unit 39 and a monitor control unit 36, which constitute a sampling light outputting unit 33, are used in a shared condition, and a waveform indicator 25*d* constituting an indicator 35 is also provided in a shared condition (see reference numerals 15, 15*d* in FIGS. 3 and 15). Moreover, each of first polarization control units 32A-1 to 32A-M, each of second polarization control units 32B-1 to 32B-M and each of sampling result outputting units 34-1 to 34-M are provided for each wavelength, and each of wavelength filters 35*a*-1 to 35*a*-M, each of photoelectric converters 35*b*-1 to 35*b*-M and each of A/D converters 35*c*-1 to 35*c*-M are provided for each wavelength. In the illustration, the components having the same functions as those in the above-described second and third embodiments are marked with the same reference numerals.

Furthermore, in comparison with the sampling light outputting unit 13 in the above-described second and third embodiments, the sampling light outputting unit 33 shared with respect to the optical waveforms with a plurality of wavelengths has a sampling light producing unit 39 in which a directional coupler 39*a* is provided on the output side of an optical amplifier 19*c*. The other configurations are basically similar thereto. M sampling light pulses obtained by the directional coupler 39*a* are distributed as the outputs of the sampling light outputting unit 33 to the second polarization control units 32B-1 to 32B-M.

Each of the second polarization control units 32B-1 to 32B-M is made to receive a sampling light pulse outputted from the aforesaid sampling result outputting unit for converting the polarization state of the inputted sampling light pulse into a linear polarization on the basis of the setting control to be implemented in the monitor control unit 36 which will be mentioned later, with the converted linear polarization being supplied to the corresponding one of the sampling result outputting units 34-1 to 34-M. Each of the second polarization control units 32B-1 to 32B-M includes a second polarization controller 12c and a second driver 12d as in the case of the above-described second and third embodiments.

In addition, each of the first polarization control units 32A-1 to 32A-M is designed to place, on the basis of the setting control by the monitor control unit 36 which will be mentioned later, each of the lights with M different wavelengths (repetition frequency is $f_0$ common thereto) into a linear polarization having a direction substantially perpendicular to the direction of the linear polarization that the polarizer 14c constituting each of the latter-stage sampling result outputting units 34-1 to 34-M permits the transmission. Each of the first polarization control units 32A-1 to 32A-M includes a first polarization controller 12a and a first driver 12b as well as the above-described second and third embodiments.

Still additionally, each of the sampling result outputting units 34-1 to 34-M is provided for each wavelength of the light under measurement and is made to output a sampling result in terms of the light under measurement having each wavelength. Concretely, the sampling result outputting units 34-1 to 34-M receives the lights under measurement having M different wavelengths from the first polarization control units 32A-1 to 32A-M and receives the sampling light pulses from the second polarization control units 32B-1 to 32B-M to output, as a sampling result, an intensity correlation signal light due to the nonlinear effect in each of the optical fibers 14b.

The monitor control unit 36 functions as an initial setting unit to individually carry out the setting control on the polarization control quantity in each of the first polarization control units 32A-1 to 32A-M and on the polarization control quantity in each of the second polarization control units 32B-1 to 32B-M on the basis of the light outputted from the directional coupler 14d constituting each of the sampling result outputting units 34-1 to 34-M, and it is composed of a power meter 36a and a comparison controller 36b which correspond to those (reference numerals 16a and 16b) in FIG. 3, respectively.

That is, according to the procedure similar to that in the above-described second embodiment, the power meter 36a and the comparison controller 36b in the monitor control unit 36 are designed to, under the determination of the mutual relationship, carry out the setting control on the directions of the linear polarizations of the sampling light pulse and the light under measurement at the stage of the input to the corresponding optical fibers 14b and on the directions of the linear polarizations, the corresponding polarizers 14c permit the transmission, independently for each wavelength which is an object of measurement.

Therefore, the monitor control unit 36, the second polarization control units 32A-1 to 32A-M and the driver 37a constitute a polarization state control unit 37 to control the polarization states of the lights under measurement and the sampling light pulses so that the lights to be outputted from the sampling result outputting units 34-1 to 34-M have a predetermined linear polarization state. The driver 37a is made to individually carry out the variable driving operation under the control of the monitor control unit 36 with respect to the directions of the linear polarizations passing through the polarizers 14c each organizing each of the sampling result outputting units 34-1 to 34-M.

Moreover, the indicator 35 is for converting the light indicative of a sampling result from the directional coupler 14d of each of the sampling result outputting units 34-1 to 34-M into an electric signal and further for sweeping the converted electric signal indicative of the sampling result to display the waveform of the light under measurement, and it is composed of wavelength filters 35a-1 to 35a-M, photoelectric converters 35b-1 to 35b-M, A/D converters 35c-1 to 35c-M and a waveform indicator 25d.

Each of the wavelength filters 35a-1 to 35a-M is for deriving a wavelength component (that is, an intensity correlation signal light component) allocated as a light under measurement with respect to the light outputted from each of the sampling result outputting units 34-1 to 34-M. Each of the photoelectric converters 35b-1 to 35b-M is for converting the intensity correlation signal light component taken out by each of the wavelength filters 35a-1 to 35a-M into an electric signal, and each of the A/D converters 35c-1 to 35c-M is for converting the electric intensity correlation signal from each of the photoelectric converter 35b-1 to 35b-M into a digital signal.

Moreover, the waveform indicator 25d receives the digital signals from the A/D converters 35c-1 to 35c-M as vertical axis input and receives a sweep signal $\Delta f$ from an oscillator 18b of the frequency generating unit 18 as horizontal axis input, thereby displaying the optical waveforms each having a wavelength. These optical waveforms having the respective wavelengths can individually be displayed, or they can also be displayed at the same time.

[D-2] Effects

For the measurement of the optical waveforms having M different wavelengths, the optical waveform measuring apparatus 41 according to the fourth embodiment thus configured carries out the setting similar to that in [B-2] of the above-described second embodiment for each optical system related to each wavelength.

That is, the measured light monitor control unit 36 places the light under measurement into an off-state and feedback-controls the angles of the wave plates 12ca and 12cb (see FIG. 3) of the second polarization controller 12c constituting each of the second polarization control units 32B-1 to 32B-M on the basis of the sampling light pulse outputted from each of the sampling result outputting units 34-1 to 34-M, thereby individually setting the polarization states of the sampling light pulses inputted to the second polarization control units 32B-1 to 32B-M at polarization states as well as the second embodiment. Moreover, the directions of the linear polarizations passing through the polarizers 14c each constituting each of the sampling result outputting units 34-1 to 34-M are also individually setting-controlled through the driver 17a.

Following this, the sampling light pulse is placed into an off-state, and the angles of the wave plates 12aa and 12ab (see FIG. 3) of the first polarization controller 12a constituting each of the first polarization control units 32A-1 to 32A-M are feedback-controlled on the basis of the light under measurement outputted from each of the sampling result outputting units 34-1 to 34-M, thereby individually setting the polarization state of the light under measurement inputted to each of the first polarization control units 32A-1 to 32A-M at polarization states as well as the second embodiment.

Thus, each of the M sampling light pulses outputted from the sampling light outputting unit 33 passes through the wave plates 12ca and 12cb (set in rotation angle) of the second polarization controller 12c constituting each of the second polarization control units 32B-1 to 32B-M, where it is converted into a linear polarization state, with the direction of the linear polarization thereof being made to have an angle of 40 to 50 degrees, preferably 45 degrees, with respect to the direction of the linear polarization passing through the polarizer 14c.

Moreover, each of the measurement lights of the M channels passes through the wave plates 12aa and 12ab (set in rotation angle) of the first polarization controller 12a constituting each of the first polarization control units 32A-1 to 32A-M, where it is converted into a linear polarization state, with the direction of the linear polarization thereof being made to have an angle to be substantially perpendicular to the direction of the linear polarization passing through the corresponding polarizer 14c.

As described above, in a state where the first and second polarization controllers 12a, 12c and the polarizer 14c are setting-controlled, the waveforms of the measurement lights of the M channels are measured as follows.

That is, in each of the sampling result outputting units 34-1 to 34-M, the light under measurement and the sampling light pulse in the corresponding channel are multiplexed (coupled) in the directional coupler 14a, so the nonlinear effect occurs in the optical fiber 14b. That is, with respect to the light passing through the optical fiber 14b, only the intensity correlation signal light component in the polarization state of the light under measurement rotates due to the Kerr effect, so the light under measurement and the intensity correlation signal light can be separated from each other through the polarizer 14c provided at the output end portion of the optical fiber 14b.

Moreover, in each of the wave length filters 35a-1 to 35a-M, only the intensity correlation signal light is derived in terms of the light under measurement related to the corresponding wavelength channel, and through the processing in each of the photoelectric converters 35b-1 to 35b-M and each of the A/D converters 35c-1 to 35c-M, the waveform of the light under measurement is displayed on a screen for each wavelength channel.

As described above, according to the fourth embodiment of the present invention, since the polarization state control unit 37 can controls the polarization state of the light under measurement to be inputted to the sampling result outputting units 34-1 to 34-M so that the waveform measurement can be made on the basis of the lights outputted from the sampling result outputting units 34-1 to 34-M, as in the case of the above-described first to third embodiments, the generation of the intensity correlation signal light has no dependency upon the polarization state of the light under measurement without employing a complicated diversity arrangement.

Still moreover, there is an advantage of preventing the generation of the intensity correlation signal light from depending upon the polarization state of the light under measurement through a relatively simple control, i.e., the feedback control on the polarization state of the light under measurement and the feedback control on the polarization state of the sampling light pulse.

Yet moreover, it is possible to faithfully observe the waveform of the light under measurement in an arbitrary polarization state with a high time resolution which is not realizable by an oscilloscope based on electric sampling and to observe a very-high-bit-rate signal light easily and stably, thereby promoting a communication system using a very-high-bit-rate signal light and the research and development of the optical signal processing technology. Add to it that it is also applicable to a monitoring apparatus such as a signal quality monitor, so it is expectable to put an easy optical signal monitor into practical use.

In addition, for the measurement of the waveforms of lights under measurement in a plurality of channels, the sampling light outputting unit 33 and the waveform indicator 35d are used in a shared condition, which simplifies the configuration and achieves the size reduction of the apparatus and the reduction of the power consumption.

Incidentally, although in the above-described fourth embodiment, the waveform measurement is made in terms of the lights having M wavelengths different from each other, the present invention is not limited to this, but it is also acceptable to include optical pulses with the same wavelengths in the case of the measurement of M series of light waveforms.

[E] Description of Fifth Embodiment

Figure 19:
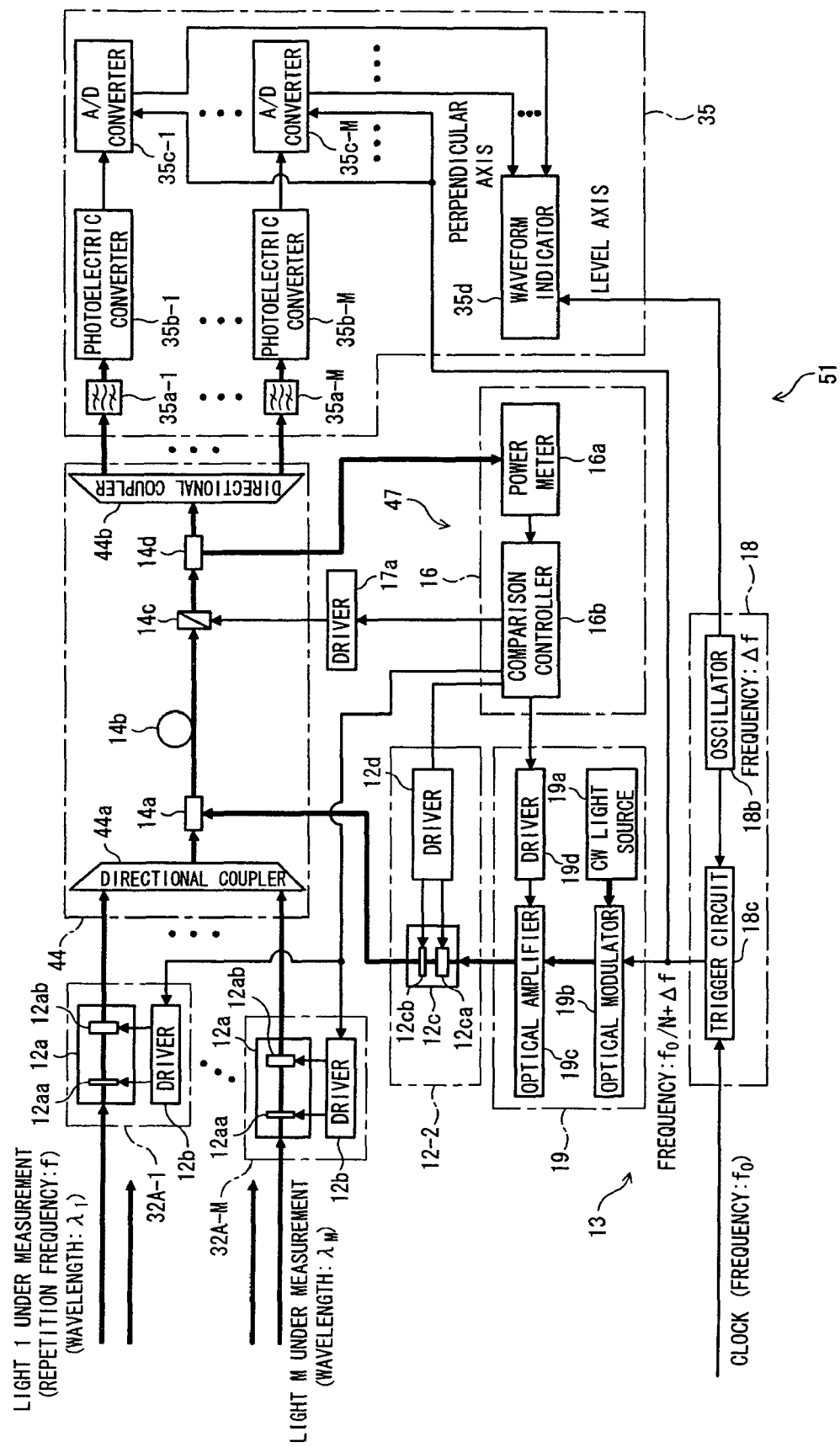
FIG. 19 is a block diagram showing an optical waveform measuring apparatus according to a fifth embodiment of the present invention.

FIG. 19 is a block diagram showing an optical waveform measuring apparatus 51 according to a fifth embodiment of the present invention. The optical waveform measuring apparatus 51 shown in FIG. 19 is designed to measure light waveforms with M wavelengths, i.e., light waveforms of a plurality of channels, as well as that (see reference numeral 41) in the above-described fourth embodiment, but it principally differs from the fourth embodiment in that an optical fiber 14b forming a nonlinear medium is put into a shared condition for the measurement of light waveforms having wavelengths.

That is, even under conditions that lights under measurement having a plurality of wavelengths (channels) exist in the optical fiber 14b, the sampling light pulse can independently induces the optical Kerr effect with respect to the signal lights with wavelengths (channels) and, hence, the optical fiber 14b constituting the sampling result outputting unit 44 can be put in a shared condition for the measurement of the waveforms of the lights under measurement having the respective wavelengths.

The optical waveform measuring apparatus 51 according to the fifth embodiment comprises a sampling light outputting unit 13, a monitor control unit 16, a second polarization state control unit 12-2 and a driver 17a, which are similar to those in the above-described second embodiment, and further includes an indicator 35 and a first polarization control unit 32A-1 to 32A-M which have configurations similar to those in the above-described fourth embodiment.

In addition, the light outputted from the sampling light outputting unit 13 and controlled in polarization state in the second polarization control unit 12-2 is used as a sampling light pulse for sampling the lights under measurement having the respective wavelengths, and the monitor control unit 16 can controls the polarization states of the lights under measurements in the first polarization control units 32A-1 to 32A-M through the first drivers 12b. In the illustration, the components basically having the same functions as those in the above-described second to fourth embodiments are marked with the same reference numerals.

In other words, the above-mentioned first and second polarization control units 32A-1 to 32A-M, 12-2, monitor control unit 16a and the driver 17a constitute a polarization state control unit 47 to control the polarization states of the light under measurement and the sampling light pulse so that the light outputted from the sampling result outputting unit 44 has a predetermined linear polarization state.

Still additionally, the sampling result outputting unit 44 comprises a directional coupler 14a, an optical fiber 14b, a polarizer 14c and a directional coupler 14d which are similar to those in the above-described second embodiment, and it further includes a directional coupler 44a for multiplexing (coupling) the lights under measurement controlled in polarization state by the first polarization control units 32A-1 to 32A-M and a directional coupler 44b for demultiplexing the light outputted through the directional coupler 14d according to wavelength channel.

The lights obtained by the demultiplexing in the directional coupler 44b are led to the wavelength filters 15a-1 to 15a-M made to take out the intensity correlation signal lights of the corresponding wavelength channels, and the waveform indicator 25d constituting the indicator 35 can measure the waveforms of the lights under measurement in the respective wavelength channels.

The optical waveform measuring apparatus 51 according to the fifth embodiment thus configured also carries out the setting similar to that in [B-2] in the above-described second embodiment for the measurement of the light waveforms with M wavelengths different from each other. At this time, since the sampling light pulse is used in common for the sampling of the lights under measurement in the respective wavelength channels, unlike the fourth embodiment, there is no need to individually set the polarization state for each channel. After the setting of the second polarization control unit 12-2 and the setting of the polarizer 14c are conducted in the monitor control unit 16, the polarization states of the lights under measurement are individually set according to the inputted polarization states of the lights under measurement in the respective channels.

Thus, the sampling light pulse outputted from the sampling light outputting unit 13 passes through the wave plates 12ca and 12cb (set in rotation angle) of the second polarization controller 12c constituting the second polarization control unit 12-2, where it is converted into a linear polarization state, with the direction of the linear polarization thereof being made to have an angle of 40 to 50 degrees, preferably 45 degrees, with respect to the direction of the linear polarization passing through the polarizer 14c.

Moreover, each of the M-channel measurement lights passes through the wave plates 12aa and 12ab (set in rotation angle) of the first controller 12a constituting each of the first polarization control units 32A-1 to 32A-M, where it is converted into a linear polarization state, with the direction of the linear polarization thereof being made to have an angle to be substantially perpendicular to the direction of the linear polarization passing through the corresponding polarizer 14c.

In a state where the first and second polarization controllers 12a and 12c and the polarizer 14c are setting-controlled as mentioned above, the waveforms of the M-channel measurement lights are measurable as in the case of the above-described fourth embodiment.

That is, in the sampling result outputting unit 44, the lights under measurement in the M wavelength channels, together with the sampling light pulse, pass through the optical fiber 14b to produce the optical Kerr effect independently and, hence, with respect to the light inputted through the polarizer 14c, the directional coupler 14d and the directional coupler 44b to each of the wavelength filters 15a-1 to 15a-M, the transmission of the wavelength channel light enables the intensity correlation signal light related to this wavelength channel to be taken out.

Thereafter, through the processing in the photoelectric converters 35b-1 to 35b-M and the A/D converters 35c-1 to 35c-M, in the waveform indicator 25d, the waveform of the light under measurement for each wavelength channel is displayed on a screen.

As described above, according to the fifth embodiment of the present invention, the polarization state control unit 47 can control the polarization state of the light under measurement to be inputted to the sampling result outputting unit 44 so that the waveform measurement can be made through the use of the light outputted from the sampling result outputting unit 44. Therefore, in addition to the advantages of the above-described first to fourth embodiments, since the optical fiber 14b forming a nonlinear medium constituting the sampling result outputting unit 44 and the sampling light outputting unit 13 are placed into a shared condition for the measurement of the waveforms of lights under measurement in a plurality of channels, it is possible to further simplify the apparatus configuration and to achieve the size reduction of the apparatus and the reduction of dissipation power.

[F] Description of Sixth Embodiment

Figure 20:
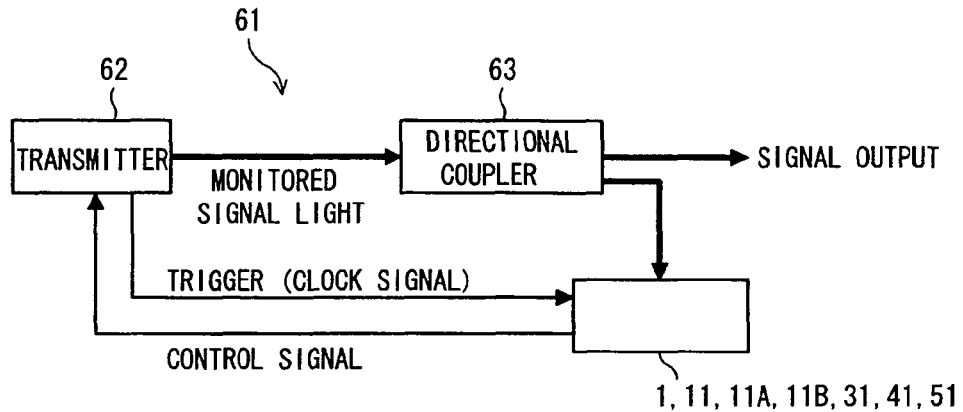
FIG. 20 is a block diagram showing an optical waveform measuring apparatus according to a sixth embodiment of the present invention.

FIG. 20 is an illustration of a sixth embodiment of the present invention. The above-described optical waveform measuring apparatuses 1, 11, 11A, 11B, 31, 41 and 51 according to the first to fifth embodiments are applicable to a transmission signal light monitoring system 61, shown in FIG. 20, which is for monitoring the quality of a transmission signal light in an optical transmitter 62 made to transmit an optical signal in an optical transmission system. That is, in FIG. 20, a portion of a signal light outputted from the optical transmitter 62 is taken by a directional coupler 63 so that the waveform thereof is observed in the optical waveform measuring apparatus 1, 11, 11A, 11B, 31, 41 or 51 according to the first to fifth embodiments to monitor the quality of the signal light. The information on the quality of the monitored signal is transmitted to a transmitter and, if the signal light quality is poor, the setting of the interior of the optical transmitter 62 is appropriately changed through the use of a control signal, thus enabling the output of a high-quality signal at all times. In this case, for example, a function for supplying the control signal to a monitor control unit is added thereto. Incidentally, the clock signal $f_0$ essential to the waveform observation can be extracted from the inputted signal light, and it is also acceptable that a clock signal to be used in the transmitter 62 is taken as a trigger signal.

Therefore, it is possible to faithfully observe the waveform of light under measurement in an arbitrary polarization state and to observe a very-high-bit-rate signal light easily and stably, thereby promoting a communication system using a very-high-bit-rate signal light and the research and development of the optical signal processing technology. Moreover, it is also applicable to a monitoring apparatus such as a signal quality monitor, so it is expectable to put an easy optical signal monitor into practical use.

[G] Description of Seventh Embodiment

Figure 21:
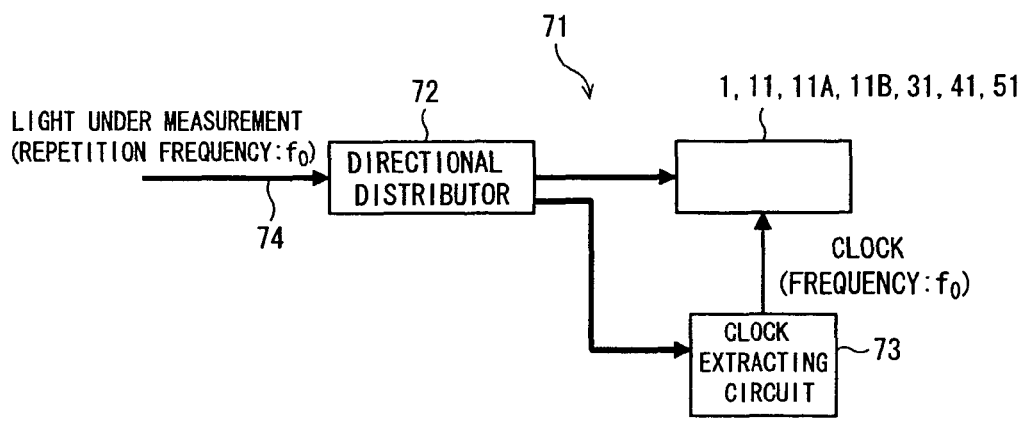
FIG. 21 is a block diagram showing an optical waveform measuring apparatus according to a seventh embodiment of the present invention.

FIG. 21 is an illustration of a seventh embodiment of the present invention. Although the sixth embodiment relates to the transmission signal light monitoring system 61 for monitoring the quality of a transmission signal light, in the seventh embodiment, the optical waveform measuring apparatus 1, 11, 11A, 11B, 31, 41 or 51 according to the first to fifth embodiments is applied to a reception signal light monitoring system 71 for monitoring the quality of a reception signal light on the optical signal reception side in an optical transmission system.

As in the case of the above-described sixth embodiment, a clock signal $f_0$ is relatively easily taken at a transmission terminal. On the other hand, a configuration different from the transmission terminal is necessary at a receiver terminal. Accordingly, a directional coupler 72 and a clock extracting circuit 73 are provided as shown in FIG. 21, thereby enabling the repetition frequency $f_0$ synchronized with a transmitted optical signal to be extracted from this optical signal.

That is, an optical signal transmitted through a transmission line 74 is divided into two by the directional coupler 72, with one being outputted as a light under measurement to the optical waveform measuring apparatus 1, 11, 11A, 11B, 31, 41 or 51 and the other being outputted to the clock extracting circuit 73. The clock extracting circuit 73 can extract the repetition frequency $f_0$ of the optical signal to supply it as a clock signal frequency $f_0$ synchronized with the light under measurement to the optical waveform measuring apparatus 1, 11, 11A, 11B, 31, 41 or 51.

Incidentally, in the clock extracting circuit 73, in a case in which the bite rate of the light under measurement is smaller in value than the response speed limit of an electronic circuit, that is, if it is below appropriately 40 Gb/s, when the light under measurement is first converted through a photoelectric converter into an electric signal and a frequency component corresponding to the bite rate is then extracted from the electric signal by means of a band-pass filter, a clock signal synchronized with the light under measurement is obtainable.

Moreover, for the extraction of a high-quality clock, it is also appropriate to employ a phase-locked loop (PLL) which makes the comparison in phase between the aforesaid electric signal and a clock outputted from a voltage controlled oscillator (VCO) to feedback the phase difference as an error signal. In the case of a high bit rate which denies the processing in an electronic circuit, a clock synchronized with the light under measurement is stably extractable through the use of a PLL circuit using an optical phase comparator.

Incidentally, as the aforesaid optical phase comparator, there has been known a device disclosed in the document (C. Boerner, et al., "160 Gbit/s clock recovery with electro-optical PLL using bidirectionally operated electro absorption modulator as phase comparator", Electronics Letters, Vol. 39, No. 14, 2003, pp. 1071-1073, or a device disclosed in the document (D. T. K. Tong, et al., "160 Gbit/s clock recovery using electro absorption modulator-based phase-locked loop," Electronics Letters, Vol. 36, No. 23, 2000, pp. 1951-1952).

Therefore, it is possible to faithfully observe the waveform of light under measurement in an arbitrary polarization state and to observe a very-high-bit-rate signal light easily and stably, thereby promoting a communication system using a very-high-bit-rate signal light and the research and development of the optical signal processing technology. Moreover, it is also applicable to a monitoring apparatus such as a signal quality monitor, so it is expectable to put an easy optical signal monitor into practical use.

[H] Description of Eight Embodiment

Figure 22:
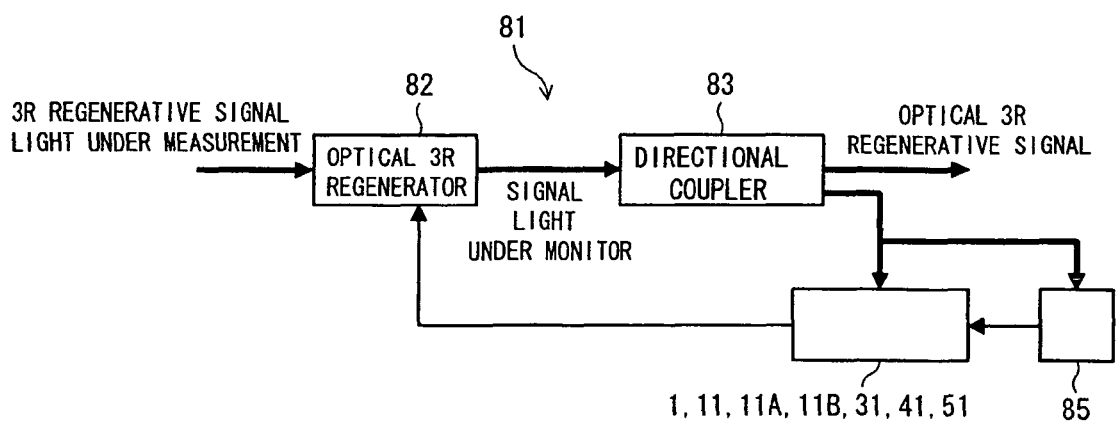
FIG. 22 is a block diagram showing an optical waveform measuring apparatus according to an eighth embodiment of the present invention.
Figure 23:
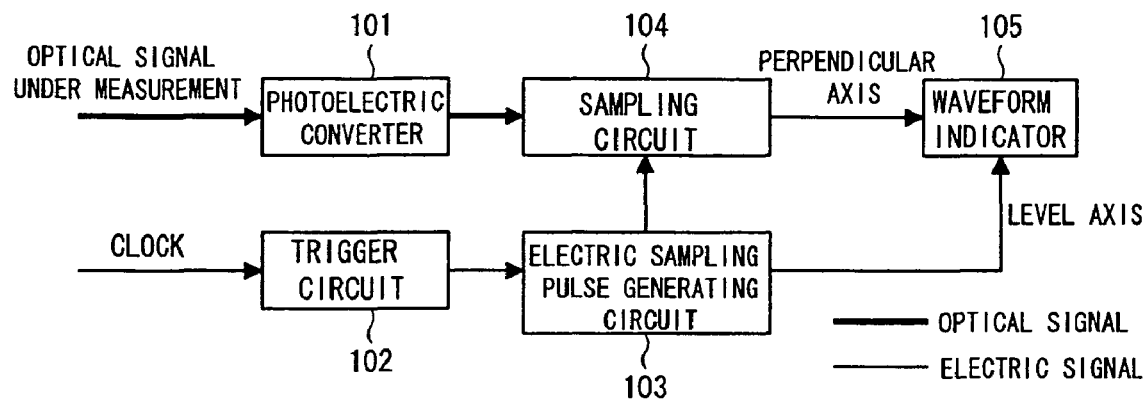
FIGS. 23 to 25 are block diagrams for describing conventional techniques.
Figure 24:
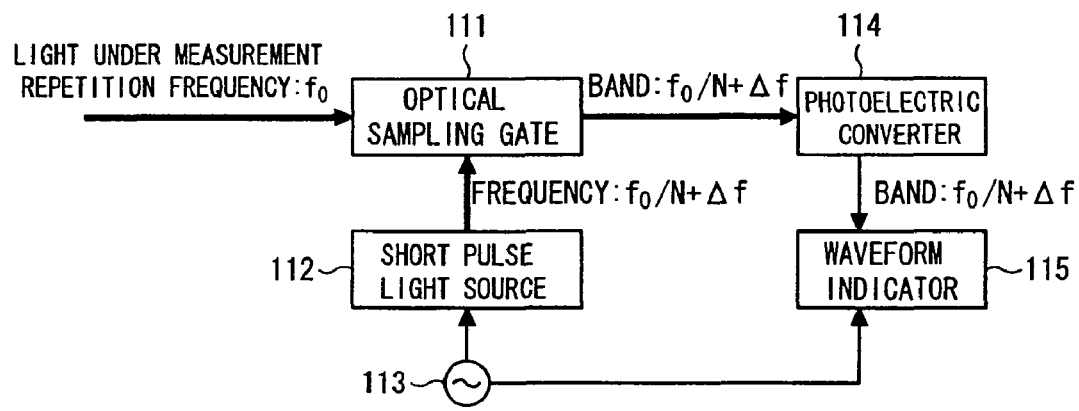
Figure 25:
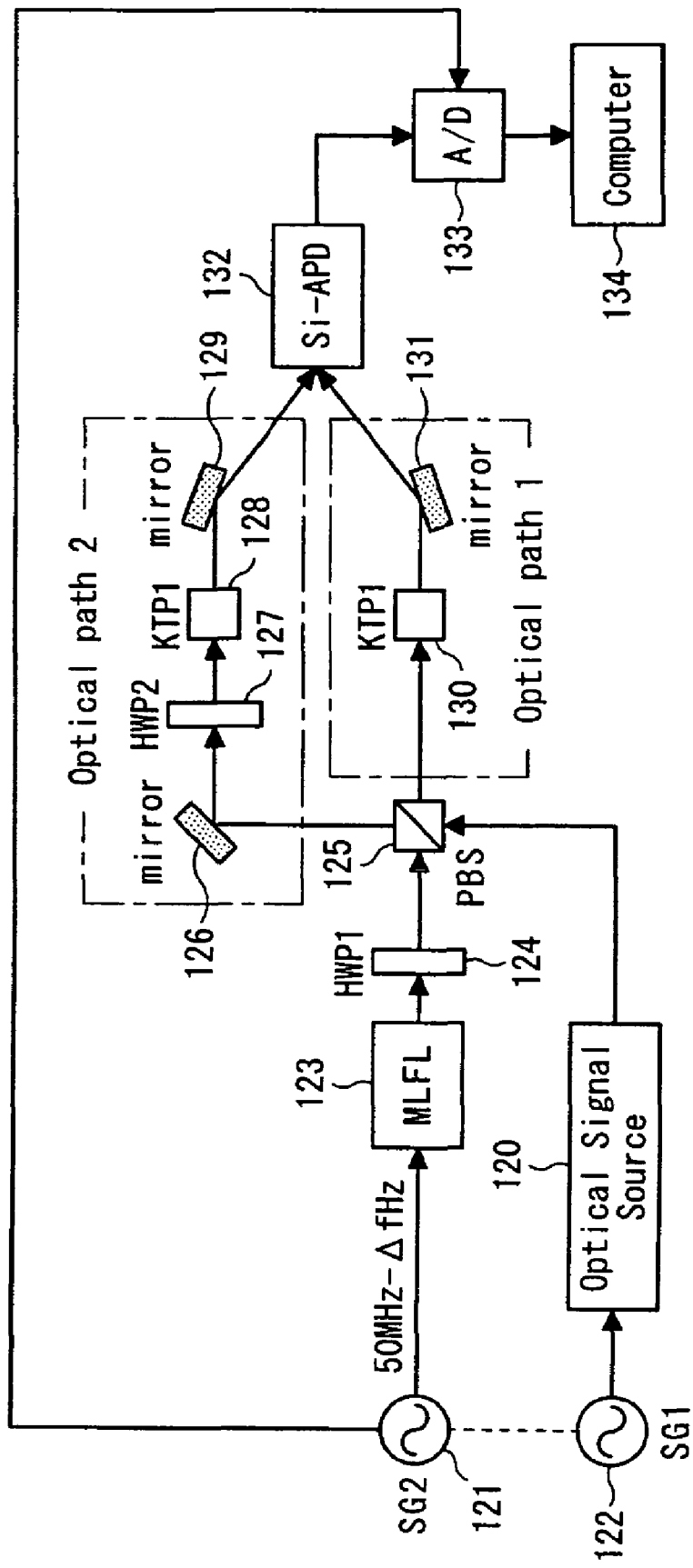

FIG. 22 is an illustration of an eighth embodiment of the present invention. In FIG. 22, the optical waveform measuring apparatus 1, 11, 11A, 11B, 31, 41 or 51 according to the first to fifth embodiments is applied to a 3R regenerative signal monitoring system 81 made to monitor an output signal of an optical 3R (Re-Shaping, Re-Timing, Re-Amplification) regenerator 82.

The 3R regenerator 82, when a signal light (3R regenerative signal light under measurement) is inputted thereto, conducts the 3R regeneration processing thereon before outputting it. A portion of the output signal from the 3R regenerator 82 is inputted through a directional coupler 83 to the optical waveform measuring apparatus 1, 11, 11A, 11B, 31, 41 or 51 so that the optical waveform measuring apparatus 1, 11, 11A, 11B, 31, 41 or 51 can monitor the quality of the signal light 3R-regenerated.

Also in the eighth embodiment, a clock extracting unit 85 is provided which has a function to extract a synchronous signal (clock signal $f_0$) as a trigger signal from a signal light under monitor.

Incidentally, as the 3R repeater 82, some optical 3R regenerations which exceed an operating speed of an electronic circuit have been proposed and demonstrated so far. For example, there has been known a technique disclosed in the document (S. Watanabe, et al., "160 Gbit/s Optical 3R-Regenerator in A Fiber Transmission Experiment," OFC2003, ThQ1, Optical Fiber Communication Conference, Atlanta, Ga., Mar. 23-28, 2003.).

In the 3R regenerative signal monitoring system 81 thus constructed, the optical waveform measuring apparatus 1, 11, 11A, 11B, 31, 41 or 51 observes, through a directional coupler 83, the quality of the optical signal 3R-regenerated in the 3R regenerator and feedbacks the observed signal quality to the optical 3R regenerator 82 as a control signal, thereby adjusting the internal setting of the optical 3R regenerator 82 upon receipt of the control signal so that the 3R regeneration effect is improved and a high-quality 3R regenerative signal light is outputted from the optical 3R regenerator 82.

This monitor of the quality of the optical signal outputted from the optical 3R regenerator 82 is particularly useful in a case in which it exceeds an operating speed of an electronic circuit. This is because, for monitoring the quality of such a very-high-bit-rate signal light in an electronic circuit, there is a need to conduct a complicated procedure, that is, first lowering the very-high-bit-rate signal light down to a bit rate handleable in an electronic circuit through the use of an optical demultiplexing unit and then converting it into an electric signal through the use of a photoelectric converter, and an extremely complicated apparatus becomes necessary in this case.

Therefore, it is possible to faithfully observe the waveform of light under measurement in an arbitrary polarization state and to observe a very-high-bit-rate signal light easily and stably, thereby promoting a communication system using a very-high-bit-rate signal light and the research and development of the optical signal processing technology. Moreover, it is also applicable to a monitoring apparatus such as a signal quality monitor, so it is expectable to put an easy optical signal monitor into practical use.

[I] Others

It should be understood that the present invention is not limited to the above-described embodiments, and that it is intended to cover all changes and modifications of the embodiments of the invention herein which do not constitute departures from the spirit and scope of the invention.

For example, although in the above-described first to fifth embodiments, an optical fiber is used as a nonlinear medium, according to the present invention, even if a KTP crystal or PPLN crystal with a polarization dependency used in conventional techniques is employed, it is possible to realize optical sampling having no dependency on polarization by controlling the polarization states of a light under measurement and a sampling light pulse in the first and second polarization control units.

In addition, in the above-described first to fifth embodiments, if a sampling light pulse is outputted in a linear polarization state to be set when inputted from the sampling light outputting unit to an optical fiber forming a nonlinear medium and a polarization maintaining optical part is used which is made to keep the polarization state outputted from the sampling light outputting unit up to an input end of the optical fiber forming the nonlinear medium, the configuration of the second polarization control unit in the above-described first to fifth embodiments is omissible.

Still additionally, naturally, the optical waveform measuring apparatus 1, 11, 11A, 11B, 31, 41 or 51 according to the first to fifth embodiments are also applicable to actual systems in modes other than the aforesaid sixth to eighth embodiments.

Yet additionally, the disclosure of the aforesaid embodiments enables the manufacturing of the apparatus according to the present invention.

What is claimed is:

1. An optical waveform measuring apparatus comprising:
   a sampling light outputting unit which outputs a sampling light pulse to sample a light under measurement;
   a sampling result outputting unit which develops a nonlinear optical effect stemming from said light under measurement and said sampling light pulse from said sampling light outputting unit to output a light corresponding to a result of the sampling of said light under measurement; and
   a polarization state control unit which carries out control of polarization states of the light under measurement and the sampling light pulse, which are to be inputted to the sampling result outputting unit, based on a power level of said light from said sampling result outputting unit, wherein
   said sampling result outputting unit comprises a directional coupler which directionally couples the light under measurement and the sampling light pulse, each having undergone the control of the polarization states thereof carried out by said polarization state control unit, respectively, and outputs a multiplexed light, a nonlinear medium which develops a nonlinear optical effect stemming from said multiplexed light, and a linear polarization component extracting unit which extracts a linear polarization component of said light under measurement, whose polarization state undergoes a variation due to said nonlinear optical effect developing in said nonlinear medium, for the waveform measurement, and
   said polarization state control unit carries out control over the polarization state of the light under measurement so that a polarization state of said light under measurement to be inputted to said nonlinear medium becomes a linear polarization substantially perpendicular to a direction of said linear polarization component to be extracted in said linear polarization component extracting unit, and further carries out control of the polarization state of the sampling light pulse so that a polarization state of said sampling light pulse to be inputted to said nonlinear medium becomes a linear polarization having an angle of 40 to 50 degrees with respect to a direction of a linear polarization to be controlled with respect to said light under measurement,
   wherein said sampling result outputting unit further comprises a temperature adjusting unit that stabilizes the temperature of the nonlinear medium to reduce an influence of an external temperature variation on the nonlinear medium.

2. The optical waveform measuring apparatus according to claim 1, wherein said sampling light pulse to be outputted from said sampling light outputting unit has a pulse width narrower than that of said light under measurement and has a sampling frequency substantially equal to or lower than a repetition frequency of the light under measurement.

3. The optical waveform measuring apparatus according to claim 1, wherein said polarization state control unit controls a polarization state of said sampling light pulse from said sampling light outputting unit through the use of a 45-degree rotation function of a polarizer.

4. The optical waveform measuring apparatus according to claim 1, wherein said sampling light outputting unit includes a frequency generating unit for generating a sampling frequency substantially equal to or lower than a repetition frequency of said light under measurement and a sampling light producing unit for producing said sampling light pulse through an optical modulation based on said sampling frequency generated by said frequency generating unit.

5. The optical waveform measuring apparatus according to claim 4, wherein said sampling light producing unit includes a continuous light source for outputting a continuous light, and a modulator for modulating said continuous light from said continuous light source into said sampling light pulse through the use of said sampling frequency generated from said frequency generating unit.

6. The optical waveform measuring apparatus according to claim 5, wherein said modulator includes a frequency chirp applying unit for applying a frequency chirp to said continuous light on the basis of said sampling frequency, a light pulsing unit for pulsing said light, to which said frequency chirp is applied by said frequency chirp applying unit, on the basis of said sampling frequency, and a dispersion compensating unit for carrying out a dispersion compensation on a light from said light pulsing unit to output the light as said sampling light.

7. The optical waveform measuring apparatus according to claim 4, wherein said sampling light producing unit includes a pulse compressing unit for pulse-compressing the light modulated by said modulator, and outputs, as said sampling light, the light compressed by said pulse compressing unit.

8. The optical waveform measuring apparatus according to claim 4, wherein said frequency generating unit includes a sweep signal producing unit for producing a sweep signal for sweeping said light under measurement, and a frequency shifting unit for receiving a clock signal synchronized with said light under measurement and for frequency-shifting the received clock signal through the use of said sweep signal from said sweep signal producing unit to generate a signal with said sampling frequency.

9. The optical waveform measuring apparatus according to claim 8, wherein said frequency generating unit includes a frequency divider for dividing down said clock signal received by said frequency shifting unit so that said frequency shifting unit frequency-shifts said clock signal, divided down by said frequency divider, through the use of said sweep signal to generate a signal with said sampling frequency.

10. The optical waveform measuring apparatus according to claim 1, wherein said polarization state control unit includes a first polarization control unit for converting said light under measurement into a linear polarization light, a second polarization control unit for converting said sampling light generated in said sampling light producing unit into a linear polarization light, and a monitor control unit for monitoring and controlling directions of the linear polarization lights, undergoing the conversion in said first polarization control unit and said second polarization control unit, on the basis of said linear polarization component of said light under measurement extracted in said linear polarization component extracting unit.

11. The optical waveform measuring apparatus according to claim 10, wherein said monitor control unit includes an initial setting unit for initially setting the direction of said linear polarization to be extracted in said linear polarization component extracting unit and the directions of said linear polarization lights undergoing the conversion in said first polarization control unit and said second polarization control unit.

12. The optical waveform measuring apparatus according to claim 11, wherein, when said sampling light pulse is not inputted, said initial setting unit initially sets the direction of said linear polarization light undergoing the conversion in said first polarization control unit and the direction of said linear polarization to be extracted by said linear polarization component extracting unit so that said linear polarization component extracted by said linear polarization component extracting unit substantially becomes at a minimum, and initially sets the direction of said linear polarization light undergoing the conversion in said second polarization control unit to make an angle of 40 to 50 degrees with respect to the initially set direction of said linear polarization light undergoing the conversion in said first polarization control unit.

13. The optical waveform measuring apparatus according to claim 1, wherein an optical filter is provided so as to flatten a wavelength characteristic of a light corresponding to a sampling result on said light under measurement from said sampling result outputting unit.

14. The optical waveform measuring apparatus according to claim 1, wherein a display unit is provided to receive a light corresponding to a sampling result on said light under measurement from said sampling result outputting unit for displaying a waveform of said light under measurement by sweeping said sampling result.

15. The optical waveform measuring apparatus according to claim 1 wherein said polarization state control unit carries out said control before the start of the measurement of said light under measurement.

16. An optical waveform measuring apparatus comprising:
a sampling light outputting unit which outputs a plurality of series of lights that are objects of waveform measurement, outputting a plurality of sampling light pulses to sample said plurality of series of lights under measurement;
a plurality of sampling result outputting units, each unit of which develops a nonlinear optical effect stemming from each of said plurality of series of lights under measurement and each of said plurality of sampling light pulses from said sampling light outputting unit to output a light corresponding to a result of the sampling of said light under measurement; and
a polarization state control unit which carries out control of polarization states of said lights under measurement and the sampling light pulse, which are to be inputted to the sampling result outputting units, based on a power level of said light from said sampling result outputting unit, wherein
each of said sampling result outputting units comprises a directional coupler which directionally couples the light under measurement and the sampling light pulse, each having undergone the control of the polarization states thereof carried out by said polarization state control unit, respectively, and outputs a multiplexed light, a nonlinear medium which develops a nonlinear optical effect stemming from said multiplexed light, and a linear polarization component extracting unit which extracts a linear polarization component of said light under measurement, whose polarization state undergoes a variation due to said nonlinear optical effect developing in said nonlinear medium, for the waveform measurement, and
said polarization state control unit carries out control over the polarization state of the light under measurement so that a polarization state of said light under measurement to be inputted to said nonlinear medium becomes a linear polarization substantially perpendicular to a direction of said linear polarization component to be extracted in said linear polarization component extracting unit, and further carries out control of the polarization state of the sampling light pulse so that a polarization state of said sampling light pulse to be inputted to said nonlinear medium becomes a linear polarization having an angle of 40 to 50 degrees with respect to a direction of a linear polarization to be controlled with respect to said light under measurement,
wherein said sampling result outputting unit further comprises a temperature adjusting unit that stabilizes the temperature of the nonlinear medium to reduce an influence of an external temperature variation on the nonlinear medium.

17. An optical waveform measuring apparatus comprising:
a sampling light outputting unit which outputs a shared sampling light pulse for sampling a plurality of series of lights that are objects of waveform measurement;
a sampling result outputting unit which develops a nonlinear optical effect stemming from said plurality of series of lights under measurement and said shared sampling light pulse from said sampling light outputting unit to output a light corresponding to a result of the sampling of each of the lights under measurement; and
a polarization state control unit which carries out control of polarization states of said lights under measurement and the sampling light pulse, which are to be inputted to the sampling result outputting unit, based on power levels of the lights from said sampling result outputting unit, wherein
said sampling result outputting unit comprises a directional coupler which directionally couples the lights under measurement and the shared sampling light pulse, each having undergone the control of the polarization states thereof carried out by said polarization state control unit, respectively, and outputs a multiplexed light, a nonlinear medium which develops a nonlinear optical effect stemming from said multiplexed light, and a linear polarization component extracting unit which extracts a linear polarization component of said light under measurement, whose polarization state undergoes a variation due to said nonlinear optical effect developing in said nonlinear medium, for the waveform measurement, and
said polarization state control unit carries out control over the polarization state of the light under measurement so that a polarization state of said light under measurement to be inputted to said nonlinear medium becomes a linear polarization substantially perpendicular to a direction of said linear polarization component to be extracted in said linear polarization component extracting unit, and further carries out control of the polarization state of the sampling light pulse so that a polarization state of said sampling light pulse to be inputted to said nonlinear medium becomes a linear polarization having an angle of 40 to 50 degrees with respect to a direction of a linear polarization to be controlled with respect to said light under measurement,
wherein said sampling result outputting unit further comprises a temperature adjusting unit that stabilizes the temperature of the nonlinear medium to reduce an influence of an external temperature variation on the nonlinear medium.

18. An optical waveform measuring method comprising
for light waveform measurement of a light, outputting a sampling light pulse for sampling a light under measurement which is an object of the measurement;
developing a nonlinear optical effect stemming from said light under measurement and said sampling light pulse to output a light corresponding to a sampling result on said light under measurement;
controlling polarization states of said light under measurement, which is the object of the measurement, and said sampling light pulse so that the light outputted as said sampling result has a predetermined linear polarization state, further comprising extracting a linear polarization component of said light under measurement, whose polarization state undergoes a variation due to said nonlinear optical effect developing in a nonlinear medium, for the waveform measurement, directionally coupling the light under measurement and the sampling light pulse, each having undergone the control of the polarization states thereof, respectively, and outputting a multiplexed light;

carrying out control over the polarization state of the light under measurement so that a polarization state of said light under measurement becomes a linear polarization substantially perpendicular to a direction of said linear polarization component to be extracted and further carrying out control of the polarization state of the sampling light pulse so that a polarization state of said sampling light pulse to be inputted to said nonlinear medium becomes a linear polarization having an angle of 40 to 50 degrees with respect to a direction of a linear polarization to be controlled with respect to said light under measurement; and stabilizing the temperature of the nonlinear medium to reduce an influence of an external temperature variation on the nonlinear medium.

19. The optical waveform measuring method according to claim 18, wherein when said sampling light pulse is not inputted, said polarization state of said light under measurement which is the object of measurement is controlled so that the light to be outputted as said sampling result substantially becomes at a minimum.

* * * * *

UNITED STATES PATENT AND TRADEMARK OFFICE
CERTIFICATE OF CORRECTION

PATENT NO. : 7,835,643 B2
APPLICATION NO. : 11/136489
DATED : November 16, 2010
INVENTOR(S) : Fumio Futami et al.

Page 1 of 1

It is certified that error appears in the above-identified patent and that said Letters Patent is hereby corrected as shown below:

Column 42, Line 57 in Claim 18, after "comprising" insert -- : --.

Signed and Sealed this
First Day of February, 2011

David J. Kappos
*Director of the United States Patent and Trademark Office*